United States Patent
Segil

(10) Patent No.: US 11,809,629 B1
(45) Date of Patent: Nov. 7, 2023

(54) WEARABLE ELECTRONIC DEVICE FOR INDUCING TRANSIENT SENSORY EVENTS AS USER FEEDBACK

(71) Applicant: Afference Inc., Lafayette, CO (US)

(72) Inventor: Jacob Segil, Boulder, CO (US)

(73) Assignee: Afference Inc., Lafayette, CO (US)

( * ) Notice: Subject to any disclaimer, the term of this patent is extended or adjusted under 35 U.S.C. 154(b) by 0 days.

(21) Appl. No.: 17/838,116

(22) Filed: Jun. 10, 2022

(51) Int. Cl.
*G06F 3/01* (2006.01)

(52) U.S. Cl.
CPC .............. *G06F 3/016* (2013.01); *G06F 3/014* (2013.01)

(58) Field of Classification Search
CPC ........... G05B 2219/40553; G06F 3/016; G06F 3/04886; B60W 50/16; F15B 13/14; H01H 13/85
See application file for complete search history.

(56) References Cited

U.S. PATENT DOCUMENTS

| | | | |
|---|---|---|---|
| 8,790,282 B2 | 7/2014 | Jung et al. | |
| 8,917,167 B1 * | 12/2014 | Selker | G06F 3/016 340/407.1 |
| 9,026,224 B2 | 5/2015 | Jung et al. | |
| 9,409,009 B2 | 8/2016 | Thota et al. | |
| 9,427,565 B2 | 8/2016 | Kuntaegowdanahalli et al. | |
| 9,563,740 B2 | 2/2017 | Abdelghani et al. | |
| 9,662,025 B2 | 5/2017 | Zbrzeski et al. | |
| 9,717,440 B2 | 8/2017 | Abdelghani et al. | |
| 9,872,989 B2 | 1/2018 | Jung | |
| 10,286,207 B2 | 5/2019 | Black et al. | |
| 10,384,057 B2 | 8/2019 | Thota et al. | |
| 10,589,098 B2 | 3/2020 | Jung | |
| 10,660,535 B2 | 5/2020 | Black et al. | |
| 11,199,903 B1 | 12/2021 | Jung et al. | |
| 11,247,051 B1 | 2/2022 | Jung et al. | |

(Continued)

FOREIGN PATENT DOCUMENTS

| | | |
|---|---|---|
| WO | WO 14/093964 | 6/2014 |
| WO | WO 15/095092 | 6/2015 |

(Continued)

OTHER PUBLICATIONS

Shell et al., "Novel Neurostimulation-Based Haptic Feedback Platform for Grasp Interactions with Virtual Objects," *Frontiers in Virtual Reality*, vol. 3, Article 910379, Jun. 3, 2022, pp. 1-12.

*Primary Examiner* — William Lu
(74) *Attorney, Agent, or Firm* — Brownstein Hyatt Farber Schreck, LLP

(57) ABSTRACT

A wearable electronic device includes an electrode array for transdermal stimulation of a sensory nerve that itself innervates a body part distal to a worn location of the wearable electronic device. The transdermal stimulation is configured to induce an electrical current or voltage that evokes a sensory impression at an area innervated by the sensory nerve, not at the stimulated sensory nerve itself. In one implementation, the wearable electronic device takes a finger ring form factor worn on a proximal phalanx of an index finger. In this configuration, the wearable electronic device can stimulate a portion of a branch of the median nerve extending through the index finger. Upon stimulation of the median nerve, a user wearing the finger ring may perceive pressure applied to the user's fingertip.

10 Claims, 20 Drawing Sheets

(56) References Cited

U.S. PATENT DOCUMENTS

| | | | |
|---|---|---|---|
| 11,402,904 B1* | 8/2022 | Jung | G06F 3/016 |
| 11,478,639 B2 | 10/2022 | Serrada et al. | |
| 2009/0112283 A1* | 4/2009 | Kriksunov | A61N 1/205 |
| | | | 607/66 |
| 2010/0268055 A1 | 10/2010 | Jung et al. | |
| 2013/0261703 A1* | 10/2013 | Chow | A61N 1/40 |
| | | | 607/61 |
| 2014/0236176 A1 | 8/2014 | Jung et al. | |
| 2014/0277583 A1 | 9/2014 | Kuntaegowdanahalli | |
| 2015/0025653 A1 | 1/2015 | Jung et al. | |
| 2015/0317910 A1* | 11/2015 | Daniels | G09B 5/065 |
| | | | 434/257 |
| 2015/0335288 A1* | 11/2015 | Toth | A61B 5/6833 |
| | | | 600/391 |
| 2017/0014625 A1* | 1/2017 | Rosenbluth | A61B 5/1101 |
| 2017/0027812 A1* | 2/2017 | Hyde | G16H 10/20 |
| 2018/0096535 A1* | 4/2018 | Schwartz | G02B 27/017 |
| 2018/0133507 A1* | 5/2018 | Malchano | A61N 1/36036 |
| 2018/0153430 A1* | 6/2018 | Ang | A61B 5/4851 |
| 2019/0001129 A1* | 1/2019 | Rosenbluth | A61N 1/08 |
| 2019/0201691 A1* | 7/2019 | Poltorak | G16H 20/70 |
| 2019/0346925 A1* | 11/2019 | Daniels | G06F 3/013 |
| 2020/0159321 A1* | 5/2020 | Ang | G06F 3/014 |
| 2020/0237031 A1* | 7/2020 | Daniels | H04W 4/029 |
| 2022/0008746 A1* | 1/2022 | Malchano | A61B 5/0036 |
| 2022/0054830 A1* | 2/2022 | Gooie | A61N 1/36132 |

FOREIGN PATENT DOCUMENTS

| | | | | |
|---|---|---|---|---|
| WO | WO 18/071494 | | 4/2018 | |
| WO | WO-2020006048 A1 * | | 1/2020 | A61B 5/01 |
| WO | WO 20/191033 | | 9/2020 | |

* cited by examiner

WEARABLE ELECTRONIC DEVICE FOR INDUCING TRANSIENT SENSORY EVENTS AS USER FEEDBACK

TECHNICAL FIELD

Embodiments described herein relate to systems and methods for providing sensory feedback to a user of an electronic device and, in particular, to wearable and/or implantable electronic devices (or combinations thereof) configured for transdermal, or direct, electrical stimulation of sensory nerves, thereby evoking a temporary referred sensation (a transient sensory event) at a perceived sensory impression site separate from a worn position of the wearable or implantable electronic device.

BACKGROUND

Mechanical feedback provided by a conventional haptic element, such as an eccentrically-weighted motor or a linear actuator, can enhance a virtual reality or augmented reality experience. As a result, many conventional virtual reality controllers, game controllers, and wearable gaming equipment (e.g., haptic gloves, head mounted displays, haptic body suits) incorporate one or more haptic elements.

However, conventional mechanical haptic feedback provided by conventional haptic elements is coarse and does not evoke natural sensations. Furthermore, many conventional controls and wearable gaming equipment significantly restrict natural range of motion, are electrically and mechanically complex, and are often expensive to purchase and maintain, difficult to store, and complicated to configure and operate. Further still, many conventional wearable gaming equipment are bulky and visually obtrusive (e.g., haptic gloves) and may not be suitable to simulate convincing augmented reality experiences.

SUMMARY

Embodiments described herein take the form of a wearable electronic device. The wearable electronic device can include a housing defining an exterior surface configured to contour to a skin surface of a user. The wearable electronic device can also include an electrode array extending at least partially through the exterior surface so as to contact the skin surface.

The wearable electronic device can further include a memory resource storing at least one executable asset and a processing resource operably coupled to the memory resource and configured to cooperate with the memory resource to access the at least one executable asset to instantiate an instance of software.

Once instantiated, the software may be configured to, without limitation: select a sense impression site (e.g., a site at which a wearer of the wearable electronic device, referred to as a "user" should perceive a sensory event to occur); select a sense impression modality (e.g., pressure, temperature, vibration or other time-varying mechanical effect, texture, and so on); query a data store with the sense impression site and sense impression modality to retrieve a stimulation profile with a magnitude and a polarity of current such that inducing the current in a sensory nerve of the user evokes a sensory impression corresponding to the sense impression modality at a sense impression site; query a data store (which may be the same or a different data store) with the stimulation profile to retrieve a calibration profile with information relating a position of the sensory nerve relative to locations of the electrodes of the electrode array (e.g., as worn by the user); create a stimulation plan with the stimulation profile and the calibration profile, the stimulation plan having parameters defining at least one signal to apply across a selected pair of electrodes of the electrode array to induce, at the sensory nerve, the current having the magnitude and polarity as defined by the stimulation profile; and execute the stimulation plan by generating and applying the at least one signal across the selected pair of electrodes.

As a result of this construction, the wearable electronic device can—on demand or in response to an input or trigger—induce a particular current within a particular region of a particular sensory nerve of the user, thereby stimulating the nerve in a manner that evokes a sensory impression occurring elsewhere in the user's body. For example, the wearable electronic device may take a finger ring form factor. In this example, the ring may stimulate a portion of the digital nerve, which in turn innervates the fingertip of the index finger or middle finger. By stimulating the median nerve in a particular manner with particular current, the user may perceive a sensory impression at the user's fingertip.

In another nonlimiting phrasing, the wearable electronic device may be configured to stimulate the median nerve in a manner that mimics a sensory signal carried from the fingertip via the median nerve to the brain in response to the fingertip pressing an object. By simulating the median nerve in the same manner, the brain may experience a "transient synesthetic event," perceiving a sensory input to a portion of the user's finger distal to the wearable electronic device. More simply, by transdermally stimulating the user's median nerve at one or more locations (e.g., at the user's wrist, palmar side, dorsal side, or elsewhere), a false sensory impression (e.g., a transient sensory/synesthetic event) that is perceived to be originating from the fingertip can be evoked. As used herein, the terms "synesthesia" and "synesthetic" refer to sensory impressions or evocations generated in one part of the body in response to stimulation of another part of the body. For example, stimulating a proximal phalanx of a finger to evoke a sensation in the distal or middle phalanx of the same finger.

Related and additional embodiments include a configuration in which the housing has an annular shape and the wearable electronic device is configured to be worn on a finger of the user. The finger, in one example, may be an index finger or a middle finger and the sensory nerve may be the median nerve. In other cases, other digital nerves associated with other fingers may be used.

Related and additional embodiments include a configuration in which the wearable electronic device may be configured to be worn on a wrist of the user, such as within a cuff or bracelet.

Some embodiments include a configuration in which a first electrode of the array of electrodes may be formed from a first metal or metal alloy and a second electrode of the array of electrodes may be formed from a second metal or metal alloy. The first and second metals may be different in some constructions.

Embodiments may include a configuration in which the instance of software is configured to modify the magnitude of current based on a user-specific profile. More specifically, an envelope for the current may be set such that any induced current does not exceed a user-specific maximum value. The user-specific value may be set by the user.

Certain embodiments include a configuration in which the instance of software is configured to receive a signal from a separate electronic device to provide feedback, as an evoked or induced sensation or sensory perception, to the user. The separate electronic device may include and/or may be configured to operate with a virtual computing environment, such as a virtual reality gaming environment.

Some embodiments described herein take the form of a method of providing sensory feedback to a user of a wearable electronic device, the method including operations such as: receiving an instruction to provide a sensory feedback to the user; selecting a sense impression site based at least in part on the instruction; receiving a stimulation profile based on the sense impression site; the stimulation profile with a property of electrical current that, when transcutaneously induced in sensory nerve of the user by operation of two or more electrodes in contact with the user's skin, evokes a sensory impression of pressing at a sense impression site; receiving a calibration profile with information relating a position of the sensory nerve to locations of the two or more electrodes; generating a stimulation plan with the stimulation profile and the calibration profile, the stimulation plan having parameters defining at least one signal to apply across the two or more electrodes to induce the electrical current (or potential gradient) at the sensory nerve; and executing the stimulation plan by generating and applying the at least one signal across the two or more electrodes.

Some embodiments described herein take the form of a method of providing sensory feedback with a wearable electronic device positioned over a sensory nerve innervating a user's hand in response to occurrence of an event in a virtual reality environment, the method operations of: receiving a signal from the virtual reality environment, the signal corresponding to the event; generating a stimulation plan with parameters defining at least one electrical signal to apply across two or more electrodes in contact with the user's skin to induce a potential at the sensory nerve, the current selected to evoke a sensory impression at a fingertip of the user; and executing the stimulation plan in response to the event.

Certain embodiments include a configuration in which the induced current has a pulse width, duty cycle, pulse magnitude, frequency, and polarity selected to evoke the sensory impression.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
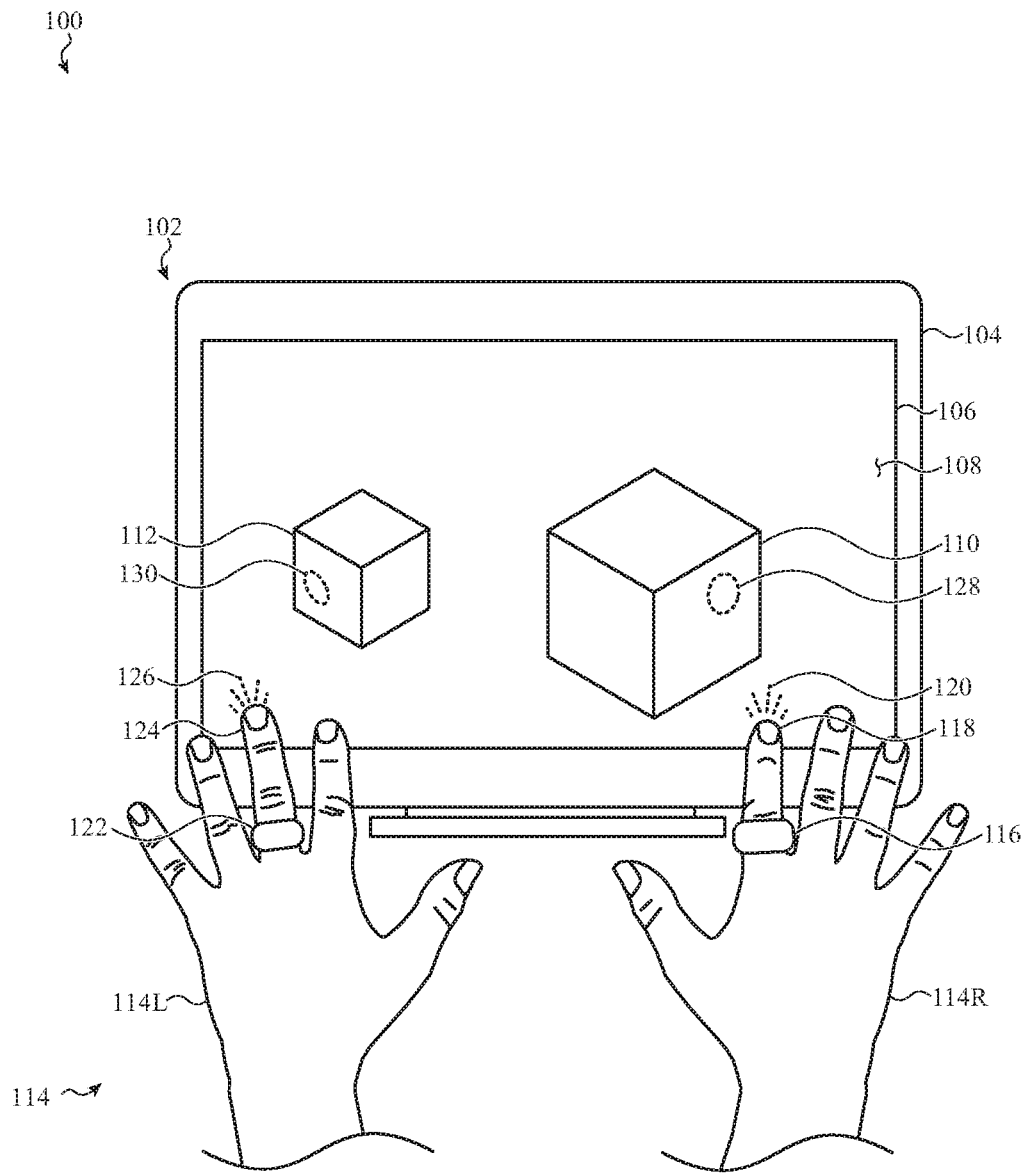
FIG. 1 depicts operation of a sensory feedback system, as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to methods for providing sensory feedback to a user of an electronic device or computing system. In particular, many embodiments described herein include a wearable electronic device or accessory that includes an array of electrodes that in many examples are disposed circumscribe a sensory nerve within a first body part that innervates a second body part distal to the first body part.

As a result of this construction and relative positioning of the wearable electronic device and the sensory nerve, application of particular electrical signals (having specific voltages, amplitudes, pulse width, duty cycle, and so on) to particular sets of electrodes of the array can induce an electrical current or potential difference across the sensory nerve so as to locally augment a membrane potential of the nerve, thereby inducing a depolarization mimicking afferent signaling from a distal area that the sensory nerve innervates. More specifically, the induced electrical signal stimulates the sensory nerve in the first body part in substantially the same manner as that same nerve would be stimulated by an afferent signal originating form the second body part.

As a result of this construction, use of the wearable electronic device can evoke sensory impressions that are perceived to be occurring at a site that is separated from the wearable electronic device.

Embodiments described herein leverage this construction to, among many applications, enhance an experience of operating a electronic device, receive feedback and/or notifications from an electronic device (e.g., a cellular phone, laptop computer, and so on), improve immersion within a virtual reality or augmented reality environment, or provide real-time sensory feedback to an operator of a remote device, such as a robotic arm or prosthetic device.

In a more simple, non-limiting phrasing, embodiments described herein are configured to induce, by application of transdermally-applied electrical signals (or, in some cases in which a stimulating electronic device is implanted, direct stimulation), an action potential at a sensory nerve that results in a sensory impression that is perceived to be occurring in another part of the body. Accordingly, as described herein, the operation of temporarily stimulating one body part to evoke a sensory impression perceived to originate from another body part is referred to as a "transient synesthetic event" or an "inducted transient synesthetic event." As noted above, as used herein, the terms "synesthesia" and "synesthetic" refer to sensory impressions or evocations generated in one part of the body in response to stimulation of another, different, part of the body. For example, stimulating a proximal phalanx of a finger to evoke a sensation in is the distal or middle phalanx of the same finger. In another example, stimulating a superficial nerve in a wrist to evoke a sensation in a palm, a finger, or a nailbed.

More broadly, many embodiments described herein reference stimulation of a section of a gross nerve to induce a feeling that is perceived to originate from a mechanoreceptor distal to that gross nerve section.

A sensation evoked by a stimulation as described herein may vary form embodiment to embodiment or stimulation to stimulation. By modifying location, frequency, pulse width, pulse amplitude, current, voltage, and/or other properties of a signal or a combination of signals applied at an electrode of an electrode array as described herein, different sensations can be evoked at different perceived sensory impression sites. As such, as described herein the phrase "sensory impression modality" refers to a type of sensory impression evoked in a user (e.g., a pressure sensation, a paresthesia sensation, a vibration sensation, a temperature change sensation, and so on) whereas the phrase "sensory impression site" refers to a location at which a user perceives a particular sensory impression to be evoked. Similarly, "stimulation site" refers to a site at which stimulation, whether transdermal or direct or a combination thereof) of a particular sensory nerve occurs.

For example, in an embodiment, a wearable electronic device worn on the proximal phalanx of the right index finger can be used to produce a first set of signals (which may vary over time), via an electrode array thereof, to stimulate a branch and/or cross section of the median nerve passing through the proximal phalanx in a manner that evokes a paresthesia sensation in the right index fingertip of the user. In this example, the stimulation site is the proximal phalanx, the sensory impression site is the fingertip (e.g., distal phalanx), and the sensory impression modality is a paresthesia sensation.

In another embodiment, the wearable electronic device worn on the proximal phalanx of the right index finger can be used to produce a second set of signals, via an electrode array thereof, to stimulate the branch and/or cross section of the median nerve passing through the proximal phalanx in a manner that evokes a temperature change sensation in the right index fingertip of the user. In this example, the stimulation site is once again the proximal phalanx, the sensory impression site is once again the fingertip (e.g., distal phalanx), but in this example, the sensory impression modality is a thermal sensation.

In another embodiment, the wearable electronic device worn on the proximal phalanx of the right index finger can be used to produce a third set of signals, via an electrode array thereof, to stimulate the branch and/or cross section of the median nerve passing through the proximal phalanx in a manner that evokes a pressure sensation in the right index fingertip of the user. In this example, the stimulation site is once again the proximal phalanx, the sensory impression site is once again the fingertip (e.g., distal phalanx), but in this example, the sensory impression modality is a pressure sensation.

In another embodiment, the wearable electronic device worn on the proximal phalanx of the right index finger can be used to produce a fourth set of signals, via an electrode array thereof, to stimulate the branch and/or cross section of the median nerve passing through the proximal phalanx in a manner that evokes a pressure sensation in the middle phalanx of the index finger of the user. In this example, the stimulation site is once again the proximal phalanx, the sensory impression site is the middle phalanx, and the sensory impression modality is a pressure sensation.

In another embodiment, a wearable electronic device worn on the wrist of the right arm can be used to produce a sixth set of signals, via an electrode array thereof, to stimulate the branch and/or cross section of the ulnar nerve in a manner that evokes a vibrating sensation in the little finger of the user. In this example, the stimulation site is the user's wrist, the sensory impression site is the little finger of the user, and the sensory impression modality is a vibrating sensation. In some embodiments, a vibrating sensation can be evoked by pulsing a set of signals that otherwise evoke a sense of pressure.

Further to these foregoing described embodiments, different sensory impression modalities and sensory impression sites can be simultaneously stimulated in a user. For example, a thermal impression can be multiplexed with a pressure sensation at the same or a different impression site to evoke a combined sensory impression.

In other cases, a sensory impression site can be moved or shifted during stimulation so that a user perceives that the sensory impression modality is moving (e.g., a pressure sensation starting at a user's fingertip and being drawn toward the user's palm).

In yet other examples, different sensory impression modalities and different sensory impression sites can be stimulated in a particular sequence or pattern to induce an overall, high-order tactile effect.

In some further examples, a transcutaneous motor nerve stimulation can be provided alongside a sensory nerve stimulation as described herein so as to both move a user's body while evoking a sensation therein. For example, a flexion or extension can be induced in a finger alongside a pressure sensation at the fingertip. This combination of motor nerve stimulation and sensory nerve stimulation can evoke a sensation of the presence of a physical object touching the user's finger and deflecting the user's finger by an amount.

Further, in some embodiments, both direct stimulation and transcutaneous stimulation can be used cooperatively to evoke particular sensory impressions. For example, a sensory nerve stimulating implant can be configured to communicably couple to a wearable electronic device positioned over the implant (e.g., providing power inductively thereto, in one example) or worn elsewhere. In these constructions, the implanted device and the wearable electronic device can be cooperatively operated to provide rich feedback (either motor or sensory or combinations thereof) to a user.

More generally and broadly, operation of a wearable electronic device as described herein to stimulate one body part to evoke a sensory impression perceived to originate from another body part can be described as "recruiting" nerve action from a sensory nerve to induce a "referred stimulation" of nerves that are innervated by the recruited nerve.

As one example, a wearable electronic device as described herein can take a finger ring form factor. One or more concentric rings of electrodes can be defined along an internal, skin-contacting, surface of the finger ring. Upon placing the wearable electronic device over the proximal phalanx of the index finger or middle finger, at least a portion of the digital nerve (that innervates the fingertip; the median nerve) passes through the center portion of the ring.

More particularly, this example, the median nerve passes through a circumferentially-distributed array of electrodes. By applying particular electrical signals across specifically selected pairs or sets of these electrodes, the median nerve can be stimulated as described above in a manner that causes a wearer of the ring to perceive that a fingertip of the index finger or middle finger is interacting with a physical object. This artificial sensory impression may be perceived by the wearer as a familiar somatosensory experience, such as an experience of pressure, temperature, texture, and so on. In this manner, the wearable electronic device recruits the median nerve to provide a referred sensation at a fingertip. In another phrasing, in this manner, the wearable electronic device induces a transient synesthetic event that causes the user to perceive that his or her fingertip is interacting with a physical object.

More generally and broadly, and in a more simple non-limiting phrasing, embodiments described herein relate to electronic devices that induce somatosensory experiences for users of those electronic devices without requiring that any portion of the electronic device physically contact a site at which the somatosensory experience is perceived to originate.

For example, in one embodiment, a wearable electronic device as described herein may be implemented as a wrist-worn cuff with electrode arrays disposed over and/or around superficial nerves innervating the hand (e.g., radial, ulnar, median). By application of particular electrical signals—which are user-specific in many embodiments—to particular sensory nerves, any number of suitable induced synesthetic experiences can be evoked.

For example, the wearable electronic device may induce a first perception of pressure at the palmar side of a user's thumb and may induce a second perception of pressure at the palmar side of the users index finger. This may cause the user to perceive that a physical object is grasped between the thumb and index finger.

In another example, the wearable electronic device may induce a perception of heat and a perception of pressure at a fingertip of the index finger. This may cause the user to perceive that the user is touching a hot object. In this example, electrical signaling associated with stimulating a recruited nerve to induce the perception of heat may be multiplexed with electrical signaling associated with stimulating the recruited nerve to induce the perception of pressure.

In yet other examples, the wearable electronic device may induce a perception of a rough texture. This may cause the user to perceive that the user is physically touching a rough-textured object.

These foregoing examples are not exhaustive of the sensory experiences that can be induced or otherwise evoked by a wearable electronic device as described herein. It may be appreciated that by suitably stimulating a recruited nerve, any combination of sensory impressions can be induced. In particular, a modality of sensory impression (e.g., a type of sensation to be simulated) and a site of sensory impression (e.g., a location from which a particular sensation should be perceived to originate can be varied and controlled by modification of stimulation parameters.

It may also be appreciated that a wearable electronic device as described herein can be used for a number of suitable purposes. For example, a wearable electronic device can be communicably coupled, either directly or indirectly, to an event stream of a virtual reality environment so that whenever a virtual character controlled by motions of a user of the virtual reality system interacts with a virtual object, the wearable electronic device can stimulate one or more nerves of the user's hands to evoke a sensation for the user that the user is physically touching and interacting with the virtual object.

In such examples, one or more wearable electronic devices can be configured to operate to stimulate sensory nerves in a number of ways to, for example, create sensory impressions of temperature, texture, pressure, and so on. In some cases, sensory impression of weight can be simulated by increasing a sense of pressure on a lower side of an object relative to an upper side of an object.

In other cases, a virtual reality environment can be configured to directly signal a wearable electronic device as described herein, in much the same manner that conventional virtual reality environments signal conventional haptic or tactile devices. In such examples, an event stream may be transmitted from a computing device associated with the virtual reality environment, the event stream including structured data objects that define one or more physical interactions between a game character and a game object (or other game players). For example, a game character may carry tools or weapons that may have different physical characteristics that can be used to inform one or more haptic responses or inducement of one or more transient synesthetic events. In some cases, haptic feedback or output information can be encoded within an audio or visual stream of data.

In some embodiments, a wearable electronic device as described herein can be configured to parse or otherwise extract an event stream of a game (whether virtual reality, augmented reality or otherwise) in order to infer when one or more transient synesthetic events should be induced for a user. In some cases, evoked sensory impressions can be triggered in response to audio or visual signals directly. For example, a trained machine learning algorithm can determine from a video stream whether a user's virtual hand contacts a virtual object. In response to such a determination, a sensory impression can be evoked as described herein in one or more of the user's fingers. In another example, sound may be used to infer that a sensory impression should be evoked. Many configurations and/or triggers (whether direct, indirect, or implied) to initiate a sensory impression as described herein are possible.

In yet other examples, a wearable electronic device as described herein can be configured to provide sensory experiences unrelated to gaming. For example, in some embodiments, a wearable electronic device as described herein can be configured to detect sensory input as well as stimulate sensory nerves as described above. In these embodiments, for example, two different wearable electronic devices can be coupled to one another—either directly or indirectly—in order to simulate physical contact over a large distance. For example, family members may be able to effectively experience holding hands at a distance. In other examples, gestures or actions of one user may be recorded and replayed for another user at a later time.

For example, a parent, grandparent, or friend may be able to record for a child, grandchild, or friend an affectionate gesture, such as tracing a heart shape over the palm of the recipients hand or squeezing a portion of the recipients hand or tapping in a particular personally meaningful pattern, which may be replayed an reexperienced by the child, grandchild, or friend on demand at a later time—potentially after the parent, grandparent, or friend has passed.

In yet other embodiments, a wearable electronic device as described herein can be leveraged as a notification device or haptic feedback device. For example, a wearable electronic device can be configured to communicably couple to a personal electronic device such as a cellular phone. In these constructions, the cellular phone can leverage the wearable electronic device to notify the user of an event, such as an incoming phone call. In one example, the wearable electronic device may be configured to cause a perception of light tapping on a dorsal side of the user's hand if the user is receiving a telephone or videoconference call.

In yet other embodiments, a wearable electronic device can be used to augment an experience of interacting with a physical object. For example, a wearable electronic device as described herein can impart a feeling of pressing a physical key when a user presses an stationary, flat, touch screen.

In other examples, a wearable electronic device can be configured to assist with direction finding. For example, the wearable electronic device can be configured to cause the user to perceive a tap on the right hand if the user is meant to turn right and to cause the user to perceive a tap on the left hand if the user is meant to turn left.

In another example, direction finding can be provided with thermal sensory experiences. For example, a user may experience a cold sensation in an index finger if the user is oriented in an incorrect direction, whereas the user may experience a warm sensation in the index finger if the user is oriented in a correct direction.

These foregoing example embodiments are not exhaustive of all use cases of the devices, architectures, and systems described herein; it may be appreciated that many configurations and uses are possible. For example, in some cases sensory impressions as described herein can be presented alongside traditional media such as music, motion pictures, art, or live performances. In such cases, different sensory impression modalities and/or different sensory impression sites can be selected to enhance and/or supplement an experience of consuming the traditional media.

For example, a finger ring form factor is merely one example form factor. Other form factors include, but are not limited to: gloves; glovelets; multi-finger rings; wrist-worn devices; implantable devices; sleeve devices; ankle cuff devices; and so on. Generally and broadly, it may be appreciated that a wearable electronic device as described herein can be suitably configured to couple to any body part over any suitable sensory nerve to induce sensory impressions in other body parts distal thereto (and innervated thereby).

In some examples, a wearable electronic device as described herein can be positioned behind a user's ear to interact with the vestibular system. In these examples, stimulation of sensory nerves can cause disorientation and/or a sense of imbalance. Such embodiments may be used to supplement experiences of viewing a suspense or horror genre motion picture or game. In some examples, such embodiments described herein may also be used to augment proprioception (e.g., in some cases, operated alongside a motor nerve stimulation system to induce particular flexion or extension and/or to prevent or oppose voluntary flexion or extension).

For simplicity of description, many embodiments that follow reference finger-ring form factor wearable electronic device configured for use with virtual computing environments and in particular to virtual reality environments. However, it is appreciated that this is merely one example implementation; the embodiments described herein can be suitably modified for a number of use cases.

Further embodiments described herein relate to field calibration of a wearable electronic device as described herein. In particular, to determining relative positions of electrodes to relative positions of sensory nerves. In many embodiments, such calibration processes can be facilitated by a portable electronic device such as a cellular phone communicably coupled to a wearable electronic device as described herein. In these constructions, the wearable electronic device can be configured to select pairs or sets of electrodes and apply predetermined electrical signals across these electrodes.

The wearable electronic device can, after a threshold period of time has elapsed, advance to select another pair or set of electrodes to apply the same or a different electrical signal across. While the wearable electronic device advances through different pairings of electrodes, the portable electronic device can render a graphical user interface that solicits feedback from the user when the user experiences a particular sensory impression modality at a particular sensory impression site. For example, the portable electronic device may render a graphical user interface with a feedback element or affordance that requests the user interact with the affordance upon experiencing a particular sensation.

In this manner, once the user interacts with the affordance, the wearable electronic device may determine that the most recently-executed signaling properly stimulated the target sensory nerve. With this information, the wearable electronic device and/or the portable electronic device can create a "calibration profile." The calibration profile can store information relating which particular electrodes pairs or sets and/or which particular electrical signal properties (e.g., amplitude, frequency, duty cycle, pulse width, and so on) evoked a correct response in the user.

The calibration profile may vary from user to user. The calibration profile may also vary each time a user wears the wearable electronic device, as relative positioning between electrodes and target sensory nerves may change from time to time. As such, in many constructions, the calibration profile may be regularly updated by the user and/or may be requested to be updated regularly by the wearable electronic device or the portable electronic device. In many cases, the calibration profile is stored in a database or other data store so that the wearable electronic device can access an appropriate calibration each time the wearable electronic device is operated to evoke a sensory experience for the user.

In some cases, the wearable electronic device may also include one or more stimulation profiles including information describing one or more signals that induce particular sensations at particular sites for a particular user. In a more simple phrasing, a simulation profile for a particular modality and a particular site (e.g., a pressure feeling at the tip of the finger) can include information about electrical current or electrical potential required to be induced in or with a particular target sensory nerve.

In this manner, a particular simulation profile comprises information describing what particular stimulation should occur to induce a particular sensory effect and a calibration profile comprises information describing how to induce particular signals over or within particular sensory nerves, given a particular user and a particular orientation with which the wearable electronic device is worn at a particular time.

More generally and broadly, by combining information contained in stimulation profiles (as described herein) and calibration profiles (as described herein), a wearable electronic device as described herein can produce and/or provide any number of sensory experiences for a particular user.

It may be appreciated that the foregoing described architectures, including implementations with calibration profiles and stimulation profiles are merely examples; these data items should not be construed as limiting of the manner in which the embodiments described herein can be implemented.

These foregoing and other embodiments are discussed below with reference to FIGS. 1-18. However, those skilled in the art will readily appreciate that the detailed description given herein with respect to these figures is for explanation only and should not be construed as limiting.

FIG. 1 depicts operation of a sensory feedback system, as described herein. The sensory feedback system 100 can, as with other embodiments described herein, leverage one or more wearable electronic devices configured to induce transient synthetic events to provide sensory experiences to a user.

The sensory feedback system 100 in this example can include an electronic device 102. The electronic device 102 can be any suitable electronic device or computing resource; in the illustrated embodiment, the electronic device 102 is a desktop computing device including a housing 104 that encloses and supports a display 106 configured to render, within an active display area of the display 106, a graphical user interface 108.

More specifically, in many embodiments, the electronic device 102 can be implemented as a computing device including a processing resource, a memory resource, communications (e.g., networking) resources, and/or one or more displays and input devices. In such examples, the electronic device 102 can be configured to leverage the processing resource(s) to access one or more executable assets form the memory resource(s) in order to instantiate software configured to render one or more graphical user interface elements in the graphical user interface 108.

For example, the software instantiated by the electronic device 102 may be a virtual reality or gaming environment configured to render one or more three dimensional objects within the graphical user interface 108. This is merely one example; any suitable user interface can be rendered in the graphical user interface 108. Other possible devices include virtual reality headsets, augmented reality headsets, pass-through camera mixed reality headsets and heads up displays, holograms, projected visual entertainment systems, mobile platforms, hand-held gaming equipment, and so on. Further, as noted above, in some cases, a wearable device as described herein can be configured to operate with real or traditional physical or virtual media such as artistic paintings/sculptures, live performances, sporting events, and so on.

For embodiments in which the graphical user interface 108 is configured to render a virtual environment, one or more objects may be render and manipulated by a user wearing one or more wearable electronic devices as described herein.

For example, in some embodiments, the graphical user interface 108 can be configured to render a three-dimensional object 110 and a three-dimensional object 112. In the illustrated embodiment, these objects are cubic objects, but it is appreciated that this simplified example is non-limiting.

In this example, a user 114 may interact with the electronic device 102 via motion tracking (not shown; a person of skill in the art may appreciate that many systems for motion tracking may be suitable to track a position of the user and/or a position in space of a body part of the user, such as a left hand 114L or a right hand 114R). In these example, a motion tracking system either incorporated into the electronic device 102 or implemented as a separate electronic device or system can be configured to track position of the right hand 114R and left hand 114L of the user 114. In such examples, motion of the user's hands can be translated by the electronic device 102 into movement of one or both of the one or more objects rendered in the graphical user interface 108. For example, motion of the right hand 114R may affect a position or orientation in the graphical user interface 108 of the three-dimensional object 110. Similarly, motion of the left hand 114L may affect a position or orientation in the graphical user interface 108 of the three-dimensional object 112.

In addition, the user 114 may use one or more wearable electronic devices such as described herein so as to enhance the experience of manipulating three-dimensional objects in the graphical user interface 108. The wearable electronic devices worn by the user may be configured, as described above, to stimulate a sensory nerve of the user 114 so as to induce or evoke a referred sensation elsewhere in the user's hand or fingers.

For example, the user 114 may wear a wearable electronic device 116 on a proximal phalanx of the index finger of the right hand 114R. As a result of this worn position, the wearable electronic device 116 at least partially circumscribes a cross section (and length) of a portion of the median nerve of the user 114. As known to a person of skill in the art, the median nerve within the index finger innervates distal portions of the index finger, including the palmar side of the fingertip (e.g., the index finger pad). As a result of this construction, the wearable electronic device 116 can leverage one or more electrodes (configured to operate with appropriate stimulation profiles and calibration profiles, such as described herein) to stimulate the median nerve (the recruited nerve) so as to evoke, in a fingertip 118, a sensory impression 120 originating at a sensory impression site at the fingertip 118 of the right hand 114R of the user 114.

In a more simple phrasing, the wearable electronic device 116, worn on the proximal phalanx of the index finger, is operated to evoke a sensory impression in the user 114 at the user's fingertip, separated from the wearable electronic device 116 by a distance. In this manner, the wearable electronic device 116 induces a transient synesthetic event in the right hand 114R of the user 114.

In addition, the user 114 may also wear a wearable electronic device 122 on a proximal phalanx of the middle finger of the left hand 114L. As a result of this worn position, as described above, the wearable electronic device 122 at least partially circumscribes a cross section (and length) of a different portion/branch of the median nerve of the user 114. As known to a person of skill in the art, the median nerve within the middle finger innervates distal portions of the middle finger, including a palmar side of the fingertip thereof. As a result of this construction, as with the electronic device 116, the wearable electronic device 122 can leverage one or more electrodes (configured to operate with appropriate stimulation profiles and calibration profiles, such as described herein, which are different from the calibration profiles and stimulation profiles of the wearable electronic device 116) to stimulate this branch/portion of the median nerve (the recruited nerve) so as to evoke in the a fingertip 124 a sensory impression 126 originating at a sensory impression site at the fingertip 124 of the left hand 114L of the user 114.

In a more simple phrasing, the wearable electronic device 122, worn on the proximal phalanx of the middle finger, is operated to evoke a sensory impression in the user 114 at the user's fingertip, separated from the wearable electronic device 122 by a distance. In this manner, the wearable electronic device 122 induces a transient synesthetic event in the right hand 114R of the user 114.

The wearable electronic devices 116, 122 can be operated in concert with (e.g., synchronized) the software executing on the electronic device 102 such that induced transient synesthetic events in the fingertips of the right hand 114R and the left hand 114L can be provided together with motion-tracked interactions with the three-dimensional objects 110, 112.

More particularly, as the user 114 moves the index finger of the right hand 114R toward a virtual surface of the three-dimensional object 110, the motion tracking system may signal the wearable electronic device 116 to induce a pressure sensation in the index finger of the user's right hand. In this manner, and as a result of this induced sensory impression, the user 114 may perceive that the user is physically touching a virtual surface of the three-dimensional object 110 at a touch location 128. Similarly, as the user 114 moves the middle finger of the left hand 114L toward a virtual surface of the three-dimensional object 112, the motion tracking system may signal the wearable electronic device 122 to induce a pressure sensation, temperature sensation, texture sensation, or time-varying sensation in the middle finger of the user's left hand. In this manner, and as a result of this induced sensory impression, the user 114 may perceive that the user is physically touching a virtual surface of the three-dimensional object 112 at a touch location 130.

These foregoing embodiments depicted in FIG. 1 and the various alternatives thereof and variations thereto are presented, generally, for purposes of explanation, and to facilitate an understanding of various configurations and constructions of a sensory impression system or sensory feedback system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

More specifically, it may be appreciated that a wearable electronic device as described herein can be co-operated with any suitable electronic device or system of electronic devices to supplement interactions with those electronic devices with sensory impressions. A wearable electronic device can be operated to, without limitation: enhance a sensory experience of playing a video game; enhance a sensory experience of navigating a virtual reality or augmented realty environment; provide sensory feedback to a surgeon performing a robot-assisted surgery; provide sensory feedback between persons separated by a distance; provide sensory feedback to differently-abled persons, such as guidance feedback to a vision impaired person; provide sensory feedback triggered by an event at an electronic device such as receipt of an incoming call or new message; provide physical feedback to a user of a planar input surface (e.g., simulating button presses or keystrokes); provide sensory feedback to guide a user's finger positions when playing an instrument; provide sensory feedback to a user when operating machinery, such as a motor vehicle; provide sensory feedback to wake a sleeping person; provide sensory feedback to an operator of a prosthetic limb; provide sensory feedback among multiple wearers to cause multiple users to experience similar or identical sensory impressions simultaneously; improve an experience of online or remote shopping, enabling a user to feel or otherwise interact with a product prior to purchase; provide sensory feedback as an authentication mechanism (e.g., a user can identify which finger or body part among many were stimulated); and so on.

In some constructions, a wearable electronic device as described herein can be configured to induce discomfort, imbalance, or disorientation for entertainment or training purposes. For example, a wearable electronic device as described herein can be positioned nearby the vestibular system of the user (e.g., behind the user's ear) and may be configured to stimulate the vestibular system to cause a perception of imbalance, nausea, vertigo, or disorientation in the user.

In yet other examples, a system as described herein may also be used to assist persons with undesirable involuntary efferent signaling (e.g., tremors and the like). In these examples, a wearable electronic device may be configured to induce electrical signaling that counteracts unintended or undesirable efferent signaling. In other cases, the wearable electronic device may be configured to induce electrical signaling that counteracts unintended afferent signaling that, in turn, causes one or more undesirable efferent signals in response.

In further embodiments, virtual objects that can be interacted with by a user can be visually emphasized in some manner, such as with a glow, a particular color, edge blurring or fuzzing, or another visual or audio indication.

These foregoing examples are not exhaustive; a wearable electronic device as described herein can be configured to operate in a number of suitable ways and may be configured to operate with, and/or in place of, many haptic notification or haptic feedback systems.

Figure 2:
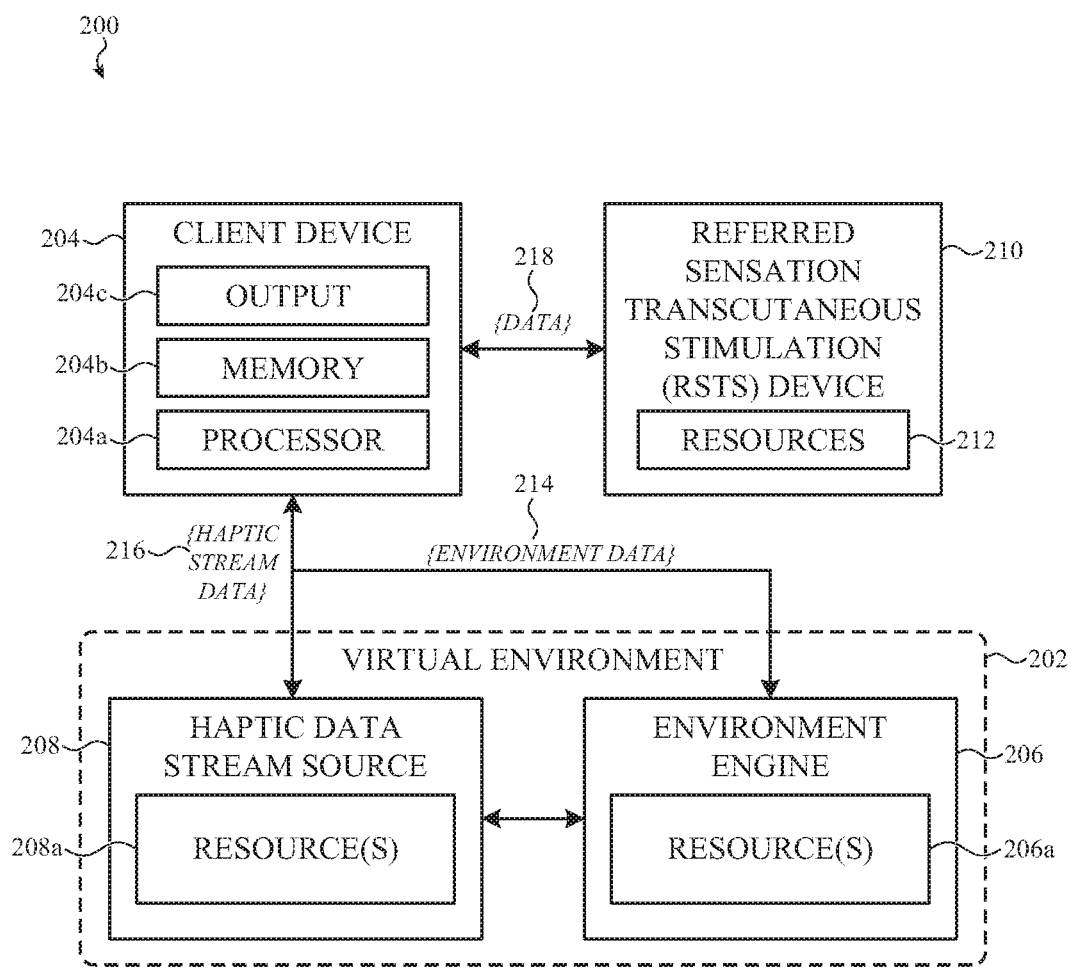
FIG. 2 depicts a simplified system diagram of a sensory feedback system, as described herein.

FIG. 2 depicts a simplified system diagram of a sensory feedback system or a sensory impression system, as described herein. The system 200 operates by cooperation of a wearable electronic device, a personal electronic device of a user, and a virtual computing/gaming environment.

Specifically, the system 200 includes a virtual environment 202 communicably coupled to a client device 204. The virtual environment 202 can be defined at least in part by an environment engine 206 (also referred to in some cases as a physics engine or game engine) and a haptic data stream source 208.

The client device 204—which may or may not be a wearable electronic device—is in turn communicably coupled to a wearable electronic device configured evoke/induce referred sensation by transcutaneous stimulation of a sensory nerve, as described herein. For simplicity of description, the embodiments that follow reference a configuration in which the client device 204 is a nonwearable electronic device such as a cellular phone configured to communicate wirelessly or over a wired connection with a wearable electronic device. For further simplicity of description, a wearable or implantable device (or combination system including at least one wearable device and at least one implantable device) as described herein configured to evoke a referred sensation by transcutaneous or direct stimulation is referred to as a "RSTS" device. In the illustrated embodiment, the client device 204 is communicably coupled to an RSTS device 210 that includes, as with other embodiments described herein, an electrode array, processing resources, memory resources, and so on so as to induce sensory impressions by stimulating a recruited nerve, such as the median nerve of a user's hand. Collectively, these resources are identified in the figure as the resources 212.

The system 200 may be a gaming system configured to present a virtual reality environment, an augmented reality environment, or a two-dimensionally rendered virtual environment (e.g., metaverse, gaming universe, and so on). In particular, game action can be computed by the environment engine 206 in response to one or more inputs provided by the client device 204, which may be communicably coupled to one or more input appliances such as game controllers or motion tracking systems. As game content is updated or computed by the environment engine 206, information describing the environment can be transmitted to the client device 204 as environment information 214. The client device 204 can consume the environment information 214 to update a graphical user interface, a rendered game environment, and so on.

In certain circumstances, the environment engine 206 may determine that a game character interacts physically with an object or other game character rendered in the same environment. For example a game character may grasp a tool or weapon, may operate virtual machinery, or the like. In response to such an event, the environment engine 206 can signal the haptic data stream source 208 to generate one or more haptic signals 216 to the client device 204. In response, the client device 204 can provide one or more haptic outputs to a user of the client device including, but not limited to, sensory impressions. More specifically, the client device 204 can be configured to signal the RSTS device 210, in response to receiving the haptic signals 216, with a sensory impression signal 218.

In a more simple and non-limiting phrasing, the system 200 can be configured to translate haptic signaling transmitted with, or separate from, game information generated by a game engine into sensory feedbacks that can be perceived by a wearer of an RSTS device, as described herein.

For example, a game environment may include one or more virtual objects. As a game character grasps the objects in the virtual environment, a haptic signal may be generated and transmitted to the client device 204. In a conventional game environment, the haptic signals may cause vibrotactile feedback to be generated in response (e.g., a game controller may vibrate to indicate that the game character has successfully interacted with a virtual object). By contrast, for embodiments described herein, the client device 204 may convert haptic signaling received from the game environment (e.g., the virtual environment 202) into sensory signaling that, when received by the RSTS device 210, can cause a wearer to experience a more genuine sensory experience. For example, in response to a game character grasping an object, a sensory impression of pressure can be induced in each of the user's ten fingertips, evoking an impression that the user his or herself is physically grasping the virtual object.

In these examples, the client device 204 can be configured to leverage structured information in the haptic signals 216 to select one or more sensory impression modalities and one or more sensory impression sites. For example, a haptic signal 216 can be structured data in a JSON format such as:

```
{
    "event_id": 7f61e0f4-b475-4563-9ed9-95eb7e546e73,
    "timestamp": "Jul. 19, 2019, 21:44.365478 UTC"
    "hand_right: {
        "index_tip": "0.5g",
        "middle_tip": "0.2g",
        "ring_tip": "0.2g"
        "little_tip": "0.2g"
    },
    "hand_left: {
        "index_tip": "0g",
        "middle_tip": "0g",
        "ring_tip": "0g"
        "little_tip": "0g"
    }
```

In this example, the haptic event may correspond to a game character lightly grasping an object with the character's right hand. In particular, this example event, a sensory impression of sub-gram pressures are instructed to be evoked at each fingertip of the right hand, but no pressure events are instructed to be evoked in the left hand.

In other examples, more detailed sensory information can be provided within the haptic signals 216. For example:

```
{
    "event_id" : d0dfd5ad-926b-4483-b679-1b2c6a0ff689,
    "timestamp" : "July 19, 2019, 21:44.5566879 UTC"
    "hand_right: {
        "index" : {
            "phalanx_proximal" : {[
                "modality" : "pressure",
                "value" : "0.5g",
                "duration" : "0.2s"
            },
            {
                "modality" : "temperature",
                "value" : "-3deg",
                "duration" : "0.2s"
            }],
            "phalanx_medial" : {[
                "modality" : "pressure",
                "value" : "0.2g",
                "duration" : "0.2s"
            },
            {
                "modality" : "temperature",
                "value" : "-3deg",
                "duration" : "0.2s"
            }],
            "phalanx_distal" : {[
                "modality" : "pressure",
                "value" : "2g",
                "duration" : "0.2s"
            },
            {
```

-continued

```
                "modality" : "temperature",
                "value" : "-3deg",
                "duration" : "0.2s"
            }]
        }
    }
}
```

In this example, the haptic event may correspond to a game character pulling a trigger of a weapon with the index finger of the right hand. In this example, pressure may be felt along the entire palmar side of the right index finger, in addition to a lower temperature (a perceived temperature delta of negative three degrees), which may simulate the feeling of grasping metal.

These foregoing embodiments depicted in FIG. 2 and the various alternatives thereof and variations thereto are presented, generally, for purposes of explanation, and to facilitate an understanding of various configurations and constructions of a sensory impression system or sensory feedback system, such as described herein, when used with a gaming environment to enrich a gaming experience. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that the client device 204 and the virtual environment 202 can each be embodied in a number of ways. In particular the client device 204 may be a computing device such as a laptop, gaming console, desktop computing device, and the like. In many constructions, the client device 204 is configured to instantiate software that in turn is configured to interface with both the RSTS device 210 and the virtual environment 202. For example, as with other embodiments described herein, the client device 204 can include a processing resource 204a and a memory resource 204b configured to cooperate to instantiate an instance of software—or more than one instance of software—configured to interface with and/or leverage one or more API endpoints of the virtual environment 202 and the RSTS device 210.

The client device 204 can also include one or more output systems such as displays, haptic elements, speakers, and the like collectively identified as the output resources 204c. In some examples, a display of the output resources 204c can be configured to render a graphical user interface that renders at least a portion of a gaming environment defined by the environment engine 206. The display may be a flat display, a curved display, a projected display, a head mounted display, or any other suitable display.

The output resources 204c can also include one or more haptic output systems such as vibrotactile actuators. These traditional haptic outputs can be provided in concert with outputs provided by the RSTS device 210.

The output resources 204c can also include one or more audio output devices configured provide audio generated by or in virtual environments defined by the environment engine 206.

In some embodiments, audio signals and/or visual signals in the environment information 214 can be provided in sync with the haptic signals 216. In other words, sounds and sights that accompany a particular haptic effect can be rendered or otherwise produced for the user at the same time. In other embodiments, haptic outputs can be provided in advance of corresponding audiovisual outputs. For example, a sensory impression provided by the RSTS device can lead a corresponding audiovisual effect by a short period, such as 100 ms. This period during which audiovisual effects are delayed can increase the realism of participating in the virtual environment because, as known to a person of skill in the art, somatosensory signaling often leads audiovisual signaling (e.g., a person may feel contact with an object before perceiving a sound associate with that contact).

Similar to the client device 204, the haptic data stream source 208 and the environment engine 206 can likewise be implemented in whole or in part in software. In particular, both systems may leverage processing and memory resources (identified as the resources 206a and the resources 208a) to instantiate different purpose configured instances of software.

These foregoing examples are not exhaustive; a system as described herein can be configured in a number of suitable ways. For example, the RSTS device 210 and the client device 204 may communicate over a local wireless protocol such as Bluetooth or Wi-Fi or Ultrawide Band. In other cases, the RSTS device 210 and the client device 204 may communicate over one or more networks, which may include the open internet. In such examples, user-specific thresholds defining limits or max/min thresholds to stimulation (as described herein) may ensure that any interference with instructions sent over the network do not result in painful or otherwise unpleasant experiences in the user.

In some cases, the virtual environment 202 can communicate with one or both of the device 204 and the RSTS device 210 over a network, which may be a private network, a cellular network, a Wi-Fi network, an intranet, or may include the open Internet. In many embodiments, authentication and authorization operations may be performed such that stimulation of a user by the RSTS device 210 cannot be incidentally triggered or otherwise intercepted/interfered with.

Figure 3:
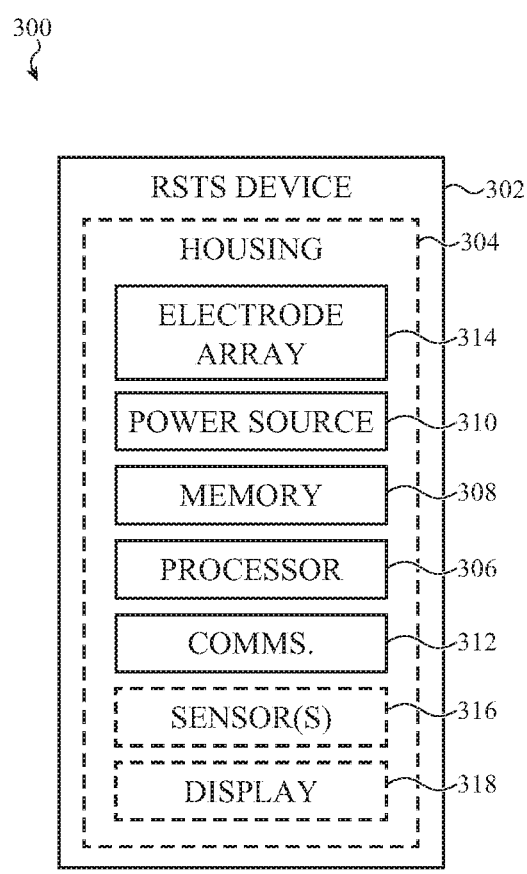
FIG. 3 depicts a simplified system diagram of a wearable electronic device configured to provide sensory feedback to a wearer.

FIG. 3 depicts a simplified system diagram of a wearable electronic device configured to provide sensory feedback to a wearer. The wearable electronic device 300 may be an RSTS device 302 such as described in reference to FIG. 2.

The RSTS device 302 includes a housing 304 the encloses and supports internal components of the RSTS device 302. As noted with respect to other embodiments described herein, the RSTS device 302 and in particular the housing 304 of the RSTS device 302 can take a number of suitable form factors. In many cases, the housing 304 takes a shape configured to contour to a portion of a limb or finger of a user, so as to at least partially circumscribe a portion or cross-section of a sensory nerve within that limb or finger that may be recruited to provide referred sensation as described herein. Example form factors that the RSTS device 302 may take include, but are not limited to, finger rings, wrist cuffs, neck cuffs, ankle cuffs, sleeves, partial sleeves, gloves, glovelets, fingerless gloves, toe rings, ear hooks, and so on.

As with many embodiments described herein, the housing 304 of the RSTS device 302 can enclose and support one or more electrical circuits configured to perform, coordinate, or otherwise execute or cause to be executed one or more operations or functions of the RSTS device 302. In the illustrated embodiment, the RSTS device 302 includes a processing resource 306 and a memory resource 308.

The processing resource 306 and the memory resource 308 can, a described elsewhere herein, can cooperate to instantiate software configured to communicate with other electronic devices (e.g., personal cellular phones, gaming consoles, and the like) and configured to stimulate recruited nerves.

In many embodiments, although not expressly required, a power source 310 may also be included in the housing 304 to provide power to the various elements of the RSTS device 302. The power source 310 can be a battery, a Peltier element, a piezoelectric element, a solar array, a tethered connection to another electronic device or power source, an inductive or resonant wireless power transfer system, or any other suitable power source.

The RSTS device 302 also includes one or more communications systems 312 for communicating with other electronic device and/or for receiving signals that indicate sensory impressions should be evoked. Example communications systems that may be included in the communications systems 312 include by are not limited to: Bluetooth; Wi-Fi; cellular (e.g, 5G NR); 433 Mhz radios; software-defined radios; infrared communications systems; acoustic communications systems; and so on.

The RSTS device 302 also includes an electrode array 314. The electrode array 314 can be disposed on or through an external surface of the housing 304. The electrode array 314 is oriented so as to interface with and/or contact a surface of the user's skin. For example, in a ring form factor, the external surface through which the electrode array 314 extends to contact the user's skin is the internal diameter of the ring. Similarly, in a wrist cuff embodiment the external surface through which the electrode array 314 extends to contact the user's skin is the internal surface of the cuff.

The electrode array 314 can include many different individual electrodes, each of which may be configured to operate as an anode (negative signal terminal) or a cathode (positive signal terminal). In some cases, multiple electrodes may serve as anode to a single cathode. In other cases, multiple electrodes can serve as cathode to a number of anodes; any suitable combination of electrodes may be selected.

The electrode array 314 can be disposed in a repeating pattern with any number of individual electricals making up the same. In some examples, the electrode array 314 includes electrodes all formed form the same material (e.g., a conductive material, such as a metal or metal alloy) and formed in the same shape, such as a square or rectilinear shape. In other cases, different electrodes may be formed from different metals or alloys and/or in different shapes. Some electrodes of the electrode array 314 can have a different surface area than other electrodes and may be formed from different materials.

In many embodiments, the electrode array 314 may be formed from a biocompatible metal material, such gold. In some cases, metals likely to trigger an allergic response in some users may be avoided (e.g., nickel, silver, and so on). In some cases, metal alloys may be selected specifically for oxidation resistance. Example electrode materials and alloys includes, but is not limited to: copper alloys; gold alloys (e.g., AgNW, AgCl); tungsten alloys (e.g., CuNW); titanium alloys; and so on.

In some constructions, the electrode array 314 includes rigid electrodes. In other cases, the electrode array 314 includes flexible and/or polymerized electrodes. In some cases, the electrode array 314 may extend proud of the exterior surface of the housing 304 so as to ensure contact with the user's skin.

These foregoing examples are not exhaustive; many electrode configurations are possible.

The RSTS device 302 can also optionally include one or more sensors 316 and/or one or more displays 318. In some cases, the display 318 may be an indicator or status light whereas in other cases, a two dimensional display (e.g., OLED, ePaper, LCD, and so on) may be used or included.

In some embodiments, the RSTS device 302 can include sensors such as temperature sensors, impedance sensors, humidity sensors, conductivity sensors, gyroscopes, accelerometers, and the like. Output from these sensors (among the sensors 316) can be used to inform or update a stimulation profile and/or a calibration profile as described herein. In other cases output from the sensors 316 can be leveraged by the processor or processing resource 306 to trigger a calibration or re-calibration process or operation. For example, a body impedance measurement can be used to inform an envelope for stimulation that may be updated in real time and/or modified over time. For example, a user's skin impedance and/or body impedance may change over the course of a day; in such cases, output form an impedance sensor or sensing system can inform whether to increase magnitude of stimulation or decrease magnitude of stimulation (as one example mutable property; other properties may be modified as well or in place in other embodiments) so as to provide a consistent sensory impression experience given varying stimulation conditions.

These foregoing embodiments depicted in FIG. 3 and the various alternatives thereof and variations thereto are presented, generally, for purposes of explanation, and to facilitate an understanding of various configurations and constructions of a wearable electronic device implemented as an RSTS device, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, a wearable electronic device as described herein can be configured to take a number of different form factors and may include one or more electrode arrays disposed in different ways.

Figure 4A:
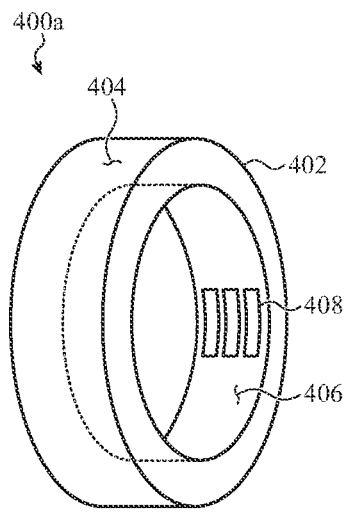
FIG. 4A depicts an example finger ring form factor wearable electronic device including an electrode array for transcutaneous stimulation of a digital nerve, thereby evoking a tactile sensation having a perceived sensory impression site separated from the wearable electronic device by a distance (an induced transient synesthetic event).

For example, FIG. 4A depicts an example finger ring form factor wearable electronic device (identified as the wearable electronic device 400a) including an electrode array for transcutaneous stimulation of the median nerve or ulnar nerve, thereby evoking a tactile sensation having a perceived sensory impression site separated from the wearable electronic device by a distance (an induced transient synesthetic event).

Specifically, the wearable electronic device 400a includes a housing 402 that has an annular or ring shape configured to be worn over a phalanx of a user. In typical circumstances, the wearable electronic device 400a is configured to be worn over a proximal phalanx, but this is not required of all embodiments.

The housing 402 can have a rigid or flexible shape. In some embodiments, the body may include one or more rigid portions and one or more flexible portions. In some embodiments, the body may be made from an elastic material so as to maintain contact with a user's finger (e.g., when worn, the housing 402 is in tension). In other cases, the housing 402 can have a flexible inner surface and a rigid outer surface. For example, an interior surface of the housing 402 can be made from an elastic material or polymer with one or more protrusions contacting the user's skin whereas an outer surface of the housing 402 can be capped with a rigid material such as a metal. Many constructions are contemplated. In some embodiments, the housing 402 may be adjustable to different internal or external diameters.

In some embodiments, the housing 402 can have a rounded shape, whereas in other embodiments a polygonal shape may be used. In some cases, the housing 402 defines a single aperture to insert a user's finger, whereas in other embodiments, more than one aperture can be positioned adjacent to one another to define a multi-finger wearable electronic device.

The housing 402 of the wearable electronic device 400a can include multiple outer surface, such as an exterior surface 404 and an exterior surface 406. The exterior surface 404 follows an external circumference of the wearable electronic device 400a and the exterior surface 406 follows an internal circumference of the wearable electronic device 400a.

The wearable electronic device 400a also includes an electrode array 408 including two or more individual electrodes. In the illustrated embodiment, a set of three electrodes are shown, but it may be appreciated that this arrangement of electrodes may be radially repeated along the exterior surface 406.

The electrode array 408 can be formed in any suitable shape, and disposed in any suitable pattern. In some cases, each electrode of the electrode array 408 has a rectilinear shape, whereas in others different shapes are contemplated. In some cases, the electrodes of the electrode array 408 form a repeating or tessellating pattern along the exterior surface 406.

Figure 4B:
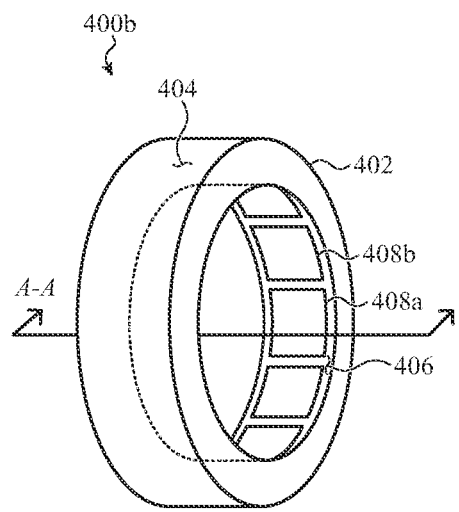
FIG. 4B depicts another example finger ring form factor wearable electronic device, including an electrode array for transcutaneous digital nerve stimulation.

FIG. 4B depicts another example finger ring form factor wearable electronic device, including an electrode array for transcutaneous median nerve stimulation. In particular, as with the embodiment shown in FIG. 4A, the wearable electronic device 400b includes a includes a housing 402 that has an annular or ring shape configured to be worn over a phalanx of a user, such as the proximal phalanx of the index or middle finger.

As with other embodiments, the housing 402 of the wearable electronic device 400b can include multiple outer surface, such as an exterior surface 404 and an exterior surface 406. The exterior surface 404 follows an external circumference of the wearable electronic device 400a and the exterior surface 406 follows an internal circumference of the wearable electronic device 400a.

The wearable electronic device 400b also includes an electrode array 408 including two or more individual electrodes, such as the electrodes 408a, 408b. In the illustrated embodiment, a circumferentially-distributed array of electrodes is shown but it is appreciated that this is merely one example.

As with other embodiments described herein, the electrode array 408 can be formed in any suitable shape, and disposed in any suitable pattern. In some cases, each electrode of the electrode array 408 has a rectilinear shape, whereas in others different shapes are contemplated. In some cases, the electrodes of the electrode array 408 form a repeating or tessellating pattern along the exterior surface 406.

Figure 4C:
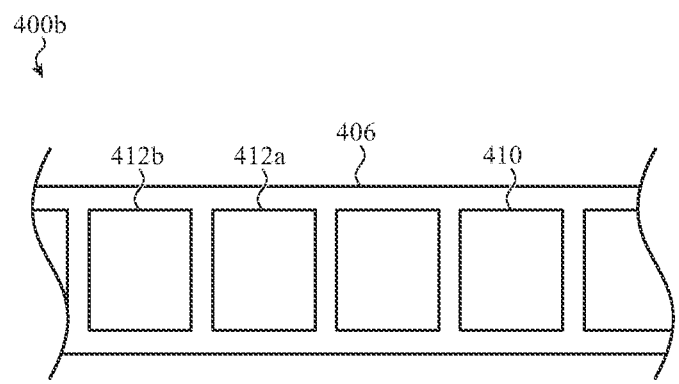
FIG. 4C depicts the electrode array of the wearable electronic device of FIG. 4B, viewed along line A-A.

Further, as noted above, different electrodes can serve different purposes at different times, as determined by a processor of the wearable electronic device 400b. For example, FIG. 4C depicts the electrode array of the wearable electronic device of FIG. 4B, viewed along line A-A.

In this example, a first electrode 410 extending through the exterior surface 406 can be operated as a cathode whereas a second and third electrode (e.g., the electrodes 412a, 412b) can be operated as anodes. In a more simple phrasing, for particular stimulation signals, a positive voltage signal may be applied to the first electrode 410 and the electrodes 412a, 412b can be coupled to system ground, serving as a return path for current. In this example, other electrodes of the system may be floating, disconnected from both system ground and the signal source.

In another example, the first electrode 410 extending through the exterior surface 406 can be operated as an anode whereas the electrodes 412a, 412b can be operated as cathodes. In a more simple phrasing, for particular stimulation signals, one or more positive voltage signals may be applied electrodes 412a, 412b while the first electrode 410 is coupled to system ground, serving as a return path for current.

These examples are not exhaustive; it may be appreciated that any number of electrodes can be defined to operate as cathodes or anodes given particular signaling or stimulation requirements for a particular embodiment.

Figure 4D:
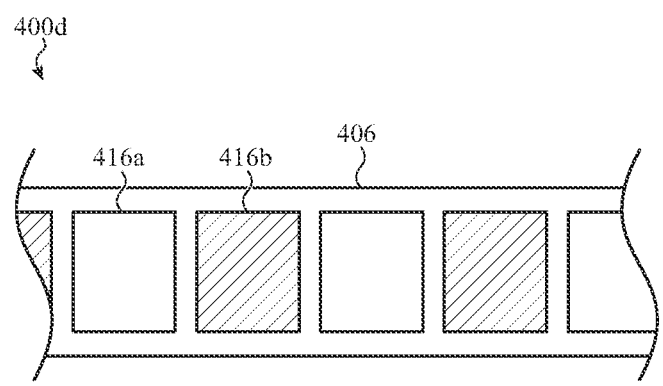
FIG. 4D depicts an electrode array that may be used by a wearable electronic device, such as described herein.

Further, as noted above, different electrodes may in some cases be formed form different materials. FIG. 4D depicts an electrode array that may be used by a wearable electronic device 400d, such as the wearable electronic device 400b of FIG. 4B. In this example embodiment, electrodes 416a, 416b, extending through the exterior surface 406, may be formed from different materials, such as copper alloys or gold alloys.

Figure 4E:
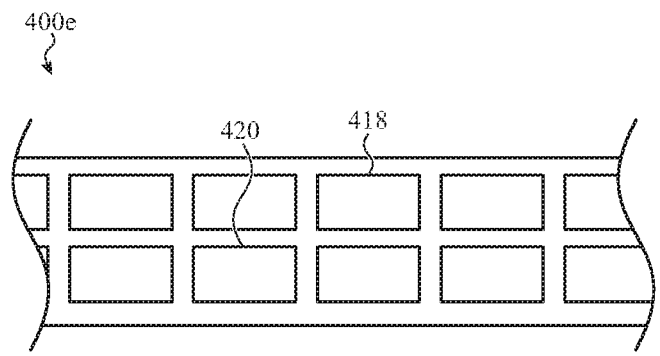
FIG. 4E depicts another electrode array that may be used by a wearable electronic device, such as described herein.
Figure 4F:
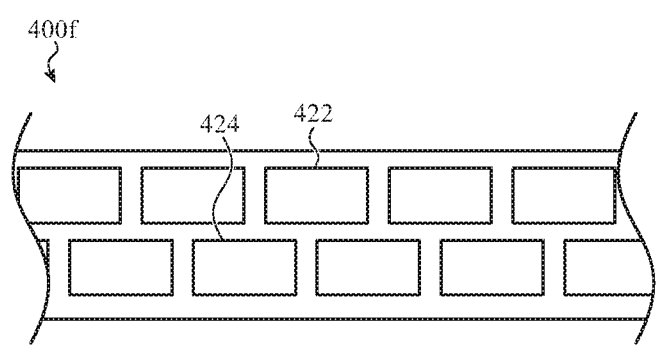
FIG. 4F depicts another electrode array that may be used by a wearable electronic device, such as described herein.
Figure 4G:
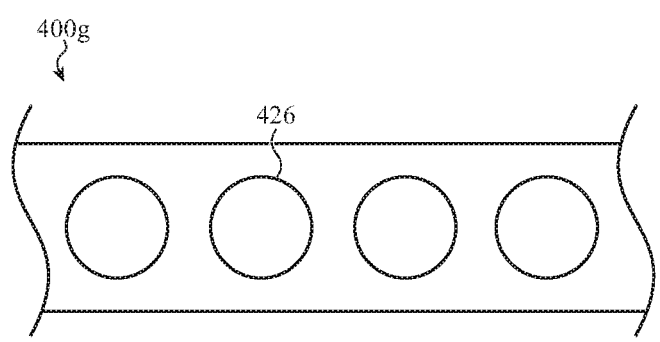
FIG. 4G depicts another electrode array that may be used by a wearable electronic device, such as described herein.

In yet other embodiments, multiple circumferential distributions of electrodes may be used. FIG. 4E depicts another electrode array that may be used by a wearable electronic device 400e, such as described herein. This electrode array includes two separate rows of electrodes, a first row including the electrode 418 and a second row include the electrode 418. In this example, the two rows are aligned relative to one another but this is not required. For example, FIG. 4F depicts another electrode array that may be used by a wearable electronic device 400f, such as described herein. In this example, two rows of electrodes can be offset relative to one another. For example, a first row of electrodes including the electrode 422 can be offset relative to a second row of electrodes including the electrode 424.

In yet other embodiments, different electrode shapes may be suitable. FIG. 4F depicts another electrode array that may be used by a wearable electronic device 400g, such as described herein. In this example, circular electrodes such as the electrode 426 may be used.

These foregoing embodiments depicted in FIGS. 4A-4G and the various alternatives thereof and variations thereto are presented, generally, for purposes of explanation, and to facilitate an understanding of various configurations of an electrode array of a wearable electronic device, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, independent of electrode layout, a wearable electronic device may be required to be calibrated from time to time so as to inform stimulation plans based on current information describing relative locations of particular electrodes to particular portions of particular sensory nerves in a user's body. In a more simple phrasing, because positioning of a wearable electronic device can change from wear to wear or throughout the course of a day, it may be necessary to periodically recalibrate the device. In particular, as noted above, it may be useful to periodically update one or more stimulation profiles and/or one or more calibration profiles.

As used herein the phrase "stimulation profile" refers to a data structure that stores values or parameters corresponding to what type of stimulation (e.g., current magnitude, polarity, pulse width, frequency, and so on) is perceived by a user to evoke a particular sensation at a particular site. In other words, parameters describing stimulation of a nerve to evoke a pressing sensation at an index fingertip are different from parameters describing stimulation of a nerve to evoke a temperature sensation at the same site (e.g., in this example, a different modality results in different stimulation parameters and a different stimulation profile). Similarly, parameters describing stimulation of a nerve to evoke a pressing sensation at a middle fingertip are also different; in this example, different sensory impression site necessitates different stimulation parameters.

Similarly, as used herein the phrase "calibration profile" refers to a data structure that sores values or parameters corresponding to how to produce a particular stimulation (e.g., defined by a stimulation profile, given a selected sensory impression modality and sensory impression site) given a particular orientation of the wearable electronic device at a particular time.

In a more simple and non-limiting phrasing, a stimulation profile may define what signal to induce to evoke a particular sensory impression (both modality and site) and a calibration profile may define how to how to induce a particular signal given a particular positioning of the wearable electronic device.

A "stimulation plan," as described herein combines information from both the stimulation profile and an up-to-date calibration profile can be used to provide particular sensory impression modalities that are perceived to originate from particular sites.

Further it may be appreciated that different wearable electronic devices can be suitable to induce sensory impressions in different ways; a cuff form factor may be able to stimulate a recruited nerve that innervates any portion of a given hand whereas a ring device may only be capable to stimulate a recruited nerve that innervates a portion of an associated finger. Different embodiments make likewise be configured to calibrate according to different workflows.

Figure 5:
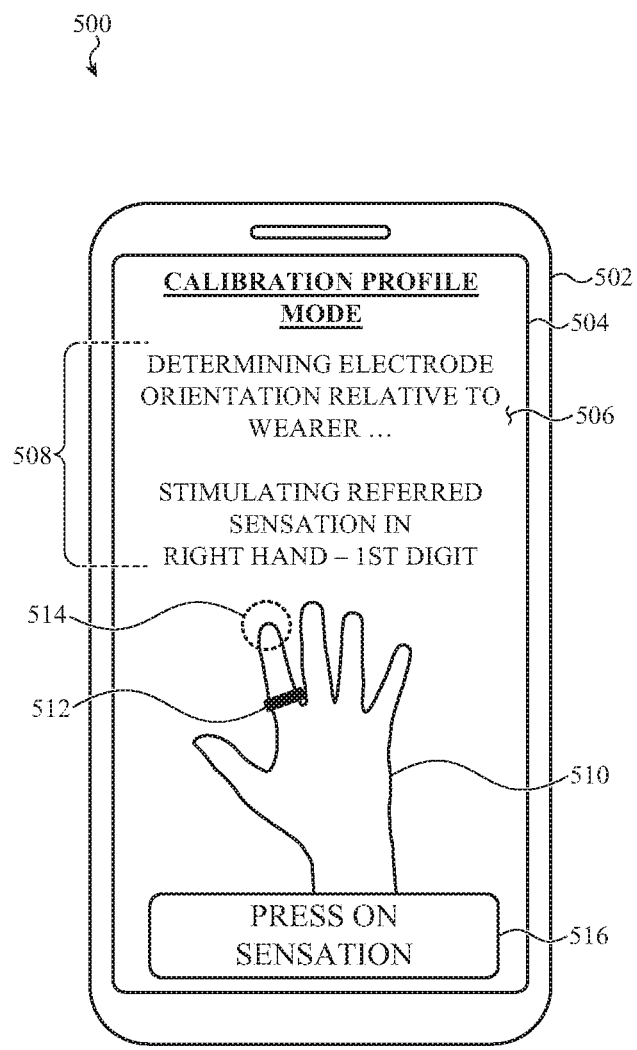
FIG. 5 depicts a portable electronic device executing an instance of a software application configured to communicably couple to, and calibrate, a wearable electronic device, as described herein.

FIG. 5 depicts a portable electronic device executing an instance of a software application configured to communicably couple to, and calibrate, a wearable electronic device, as described herein. The operations described in reference to FIG. 5 may inform creation or update of a calibration profile and/or or stimulation profile as described herein.

The portable electronic device 500 is implemented as a cellular phone, although this is merely one example electronic device. Other examples include laptop devices, desktop devices, wearable devices (e.g., smart watches, head mounted displays, and so on), and so on.

The portable electronic device 500 includes a housing 502 to enclose and support components of the portable electronic device 500. In many examples, the housing 502 encloses a processing resource and a memory resources and a display, such as the display 504.

As with other embodiments described herein, the processor resources and memory resources can cooperate to instantiate a software application that, in turn, can render a graphical user interface 506 with the display 504.

The portable electronic device 500 and/or the software application (which can be referred to herein as a "client application" or a "frontend") can be configured to communicably couple with a wearable electronic device as described herein. In some cases, although not required, the portable electronic device 500 is configured to communicably couple to a ring form factor electronic via Bluetooth or Ultrawide Band communication protocols. These are merely examples; other embodiments can leverage other communications systems.

The portable electronic device 500 and/or the client application can also be configured to communicably couple to one or more third party systems, referred to collectively as host services. The host services may be backend instances of one or more software platforms associated with providing sensory impressions via a wearable electronic device such as described herein. In other cases, the backend platforms may be associated with one or more virtual computing environments or virtual gaming environments.

In some cases, the portable electronic device 500 may receive information in structured data format from a backend system to initiate a calibration operation for the wearable electronic device. In other cases, the portable electronic device 500 may receive information in structured data format from the wearable electronic device itself to initiate a calibration operation for the wearable electronic device. In yet further embodiments, the portable electronic device 500 may periodically (e.g., daily, hourly, on a schedule, and so on) may initiate a calibration operation for the wearable electronic device.

FIG. 5 depicts the graphical user interface 506 as rendering an example user interface that may be rendered during a calibration operation of a wearable electronic device as described herein. The graphical user interface 506 can include information 508 presented to a user providing instructions for advancing calibration of the wearable electronic device.

In some cases, the graphical user interface 508 may also include a virtual body part 510, such as a hand, to visually indicate to a user where to wear the wearable electronic device 512. The graphical user interface 506 may also visually indicate a test site 514 informing the user where to expect sensory feedback to occur.

During a calibration operation, the wearable electronic device may iteratively select pairs or sets of electrodes and apply predetermined test signals across those pairs. In many examples, these test signals may have limited magnitude so as to not unintentionally trigger a painful response in the user.

The wearable electronic device can progressively change what stimulation is provided through which electrodes. When the user experiences a sensation at the test site 514, the user may indicate to the client application that a successful stimulation has occurred by interacting with an affordance 516.

Once the user indicates that an intended sensation has been experienced, further refining of signals applied can be performed. For example, the wearable electronic device can modify one or more properties of the test signal that evoked the intended sensory impression. Such properties include modifying frequency, duty cycle, magnitude, anode/cathode assignments among different electrodes; duration of stimulation; and so on.

In response to each "refining" operation, the user may interact with the affordance 516—or another graphical user interface element—to indicate to the client application that the sensory experience is perceived in a different way. For example, in some cases, the graphical user interface 506 may include a button to indicate that a recent stimulation is more localized than a previous stimulation. Another button may be included to indicate that a recent stimulation is less localized than a previous stimulation. Another button may be included to indicate that a recent stimulation evoked a thermal sensation, a pressure sensation, a texture sensation, or another modality. Another button may be included to indicate whether a particular stimulation was painful or approaching a painful experience. In such examples, the wearable electronic device and/or the client application can define one or more absolute thresholds for a particular user, based on the user's perception. In these examples, any stimulation provided by the wearable electronic device will be below pain thresholds for the user, regardless of modality, site, or calibration.

In some cases, the operations described in reference to the embodiment shown in FIG. 5 can be used to develop or update a calibration profile. Once a calibration profile is established (e.g., more generically, once an approximate location of a sensory nerve to stimulate is determined), the wearable electronic device may advance to generate a stimulation profile, such as shown in FIG. 6.

Figure 6:
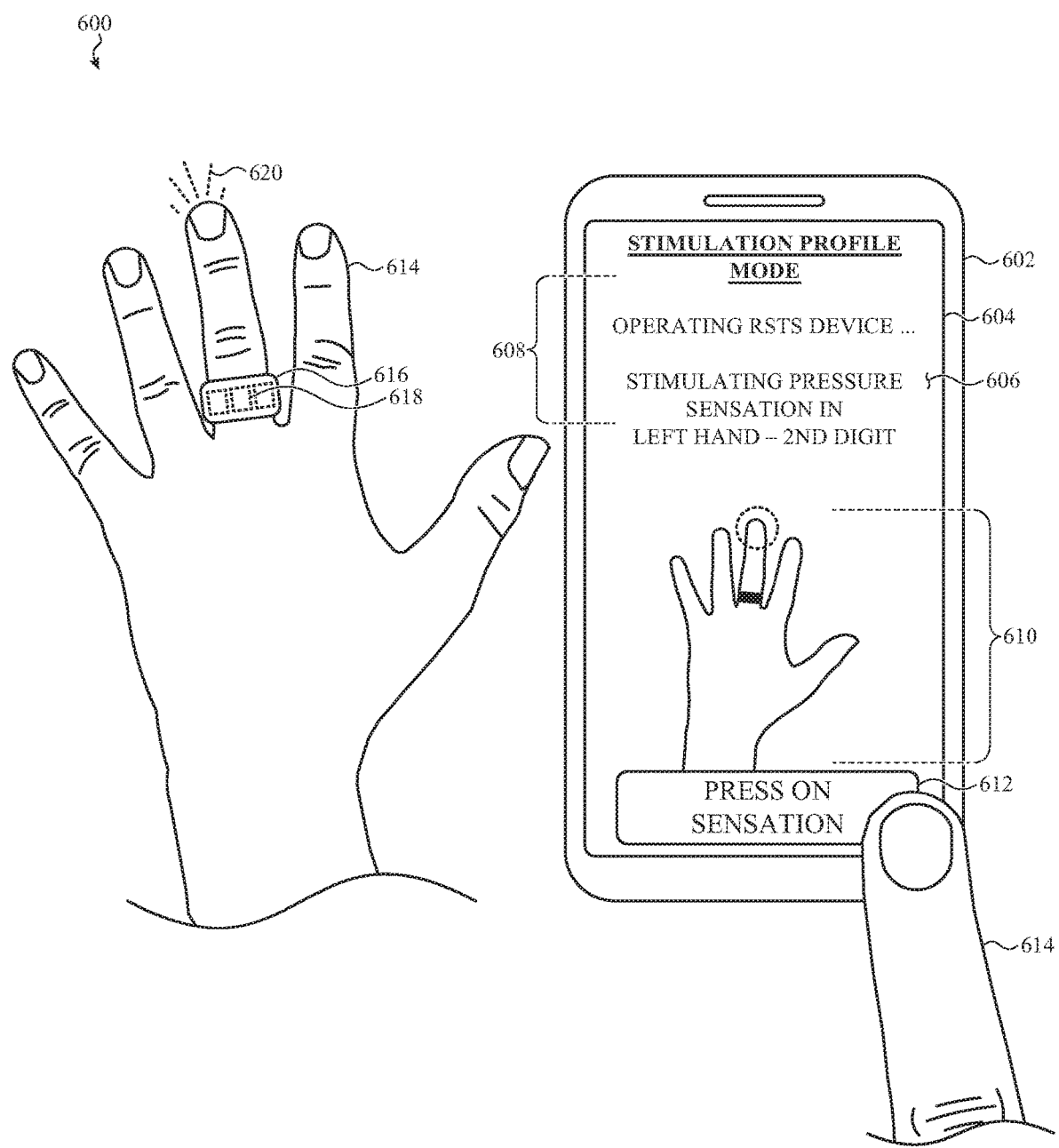
FIG. 6 depicts a portable electronic device executing an instance of a software application configured to communicably couple to, and calibrate, a wearable electronic device, as described herein.

FIG. 6 depicts a portable electronic device executing an instance of a software application configured to communicably couple to, and calibrate, a wearable electronic device, as described herein. As with FIG. 5, the system 600 of FIG. 6 includes a portable electronic device 602 that includes a display 604 over which a graphical user interface 606 is rendered. This graphical user interface 606 can include instructions 608 and a visualization 610 informing the user of how/where to wear the wearable electronic device, where to expect a sensory impression to be evoked, and what modality that sensory impression takes. In response to experiencing the indicated sensation at the indicated site (in the figure, a pressing sensation at a fingertip of the left middle finger), an affordance 612 can be pressed by the user 614 to indicate to the device that the identified sensation was experienced.

Specifically, as noted above, during calibration the wearable electronic device 616 can iterate through one or more combinations of signals and cathode/anode pairs or sets selected from one or more electrodes 618. The wearable electronic device 616 can pause for a period of time between each test stimulation to afford the user 614 an opportunity to interact with the client application rendering the graphical user interface 606 to indicate whether a particular sensory impression 620 has been experienced.

As with other embodiments described herein, once the user 614 indicates that an intended sensation has been experienced, further refining of signals applied via the electrodes 618 can be performed. For example, the wearable electronic device 616 can modify one or more properties of the test signals that evoked the intended sensory impression having the intended sensory impression modality and the intended sensory impression site. As noted above, such properties include modifying frequency, duty cycle, magnitude, anode/cathode assignments among different electrodes; duration of stimulation; and so on.

In response to each refining operation, as with other embodiments, the user 614 may interact with the affordance 612—or another graphical user interface element rendered in the graphical user interface 606—to indicate to the client application that the sensory experience is perceived in a different way. In other cases, the client application can be configured to monitor acoustic signals and/or may be configured for voice recognition or speech to text conversion. In these examples, a user may audibly indicate "yes" or "no" or similar feedback to indicate to the client application that an intended sensory impression was experienced or not.

In other cases, the graphical user interface 606 may include multiple buttons to indicate different attributes of a sensory experience felt by the user 614. For example, the graphical user interface 606 may include a button to indicate that a recent stimulation is more localized than a previous stimulation. Another button may be included to indicate that a recent stimulation is less localized than a previous stimulation. Another button may be included to indicate that a recent stimulation evoked a thermal sensation, a pressure sensation, a texture sensation, or another modality. Another button may be included to indicate whether a particular stimulation was painful or approaching a painful experience. In such examples, the wearable electronic device and/or the client application can define one or more absolute thresholds for a particular user, based on the user's perception. In these examples, any stimulation provided by the wearable electronic device will be below pain thresholds for the user, regardless of modality, site, or calibration.

These foregoing embodiments depicted in FIGS. 5-6 and the various alternatives thereof and variations thereto are presented, generally, for purposes of explanation, and to facilitate an understanding of various configurations of an electronic device that may be used to assist with field calibration of a wearable electronic device, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 7A:
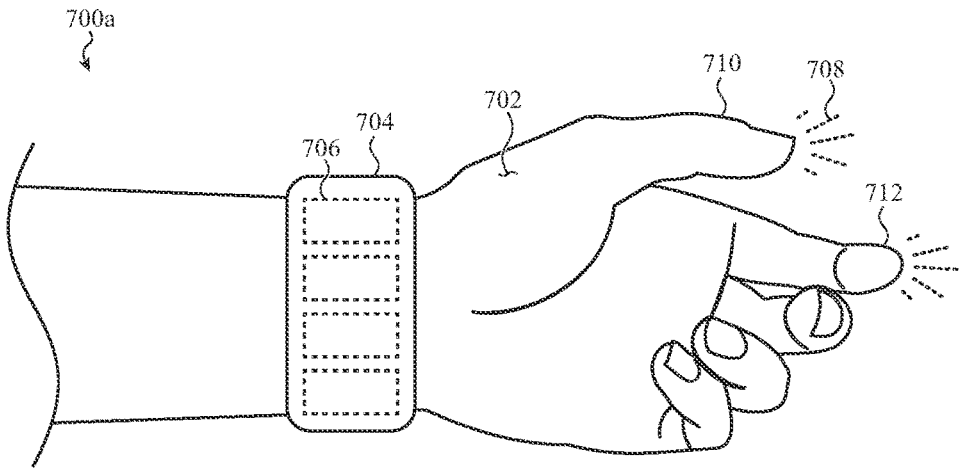
FIG. 7A depicts an example cuff form factor wearable electronic device including an electrode array for transcutaneous stimulation of a digital nerve, thereby evoking an induced transient synesthetic event having a perceived sensory impression site different from a stimulation site.

For example, although the wearable electronic devices described in reference to FIGS. 5-6 take a ring form factor, this is not required of all embodiments. For example, FIG. 7A depicts an example cuff form factor device, the wearable electronic device 700a worn by a user 702 in a housing 704 over a wrist of the user 702. The wearable electronic device 700a includes an electrode array 706 for transcutaneous stimulation of the median nerve or ulnar nerve, thereby evoking (as one example), a first induced transient synesthetic event 708 in the user's thumb 710 or a second induced transient synesthetic event 712 in the user's index finger.

Figure 7B:
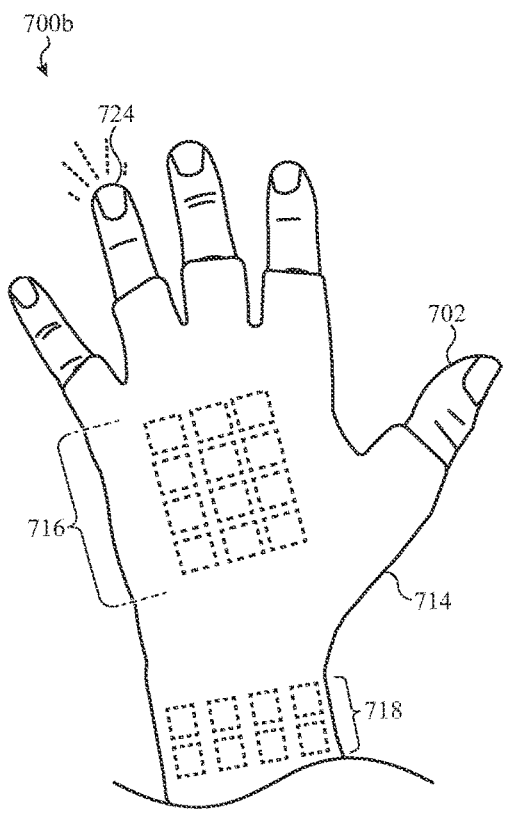
FIG. 7B depicts an example glove form factor wearable electronic device in a palm down position, the wearable electronic device including an electrode array for transcutaneous stimulation of various sites of a user's hand, thereby evoking an induced transient synesthetic event having a perceived sensory impression site different from a stimulation site.
Figure 7C:
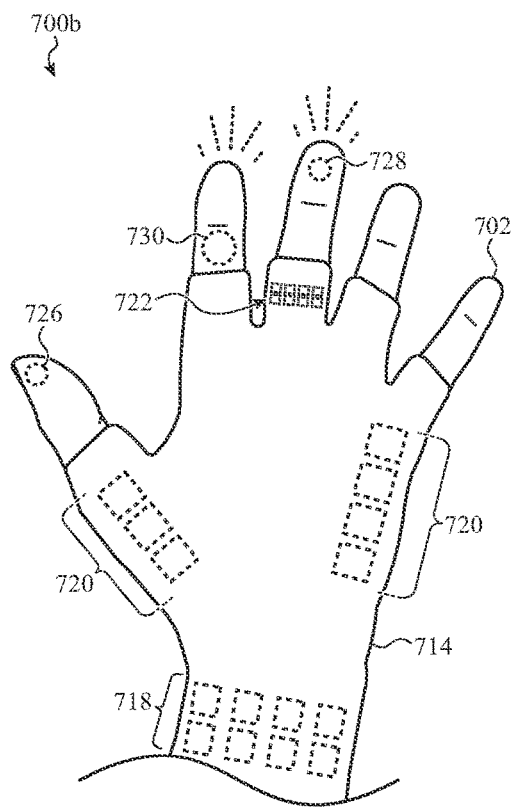
FIG. 7C depicts the wearable electronic device of FIG. 7B in a palm up position.

In another example embodiment, a wearable electronic device may take the form of a glove. FIG. 7B depicts an example glove form factor implemented as the wearable electronic device 700b in a palm down position (shown in a palm-up position in FIG. 7C). As with other embodiments, the wearable electronic device 700b can be worn as a glove 714 on a hand of the user 702 and can include one or more electrode arrays, each of which may be configured to stimulate different recruited gross nerves, branches, or groups. Example electrode arrays depicted in the figure include the electrode arrays 716, 178, 720, and 722. These arrays can be operated independently or cooperatively to induce sensory impressions at one or more sites in one or more modalities, such as the sensory impression sites 724, 726, 728, and 730.

Figure 7D:
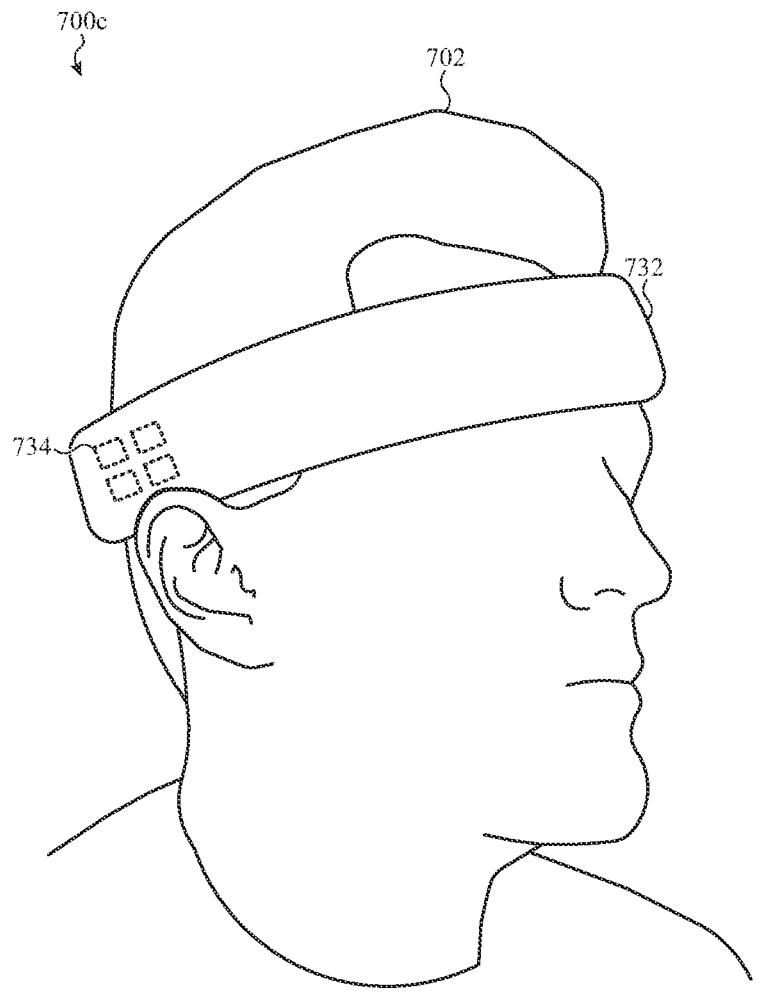
FIG. 7D depicts a wearable electronic device, as described herein, having a headband form factor.

In yet other embodiments, such as shown in FIG. 7D, a wearable electronic device as described herein can take a head-worn form factor such as a virtual reality headset, an augmented reality headset, head-mounted displays, heads-up displays, glasses, earphones, earbuds, ear hooks, or as shown in FIG. 7D, a headband.

In this example embodiment 700c, the user 702 wears a headband 732 in a manner so as to position a set of electrodes 734 nearby the user's vestibular system. In these examples, the user's vestibular system can be stimulated so as to evoke a sense of imbalance, disorientation, or other similar sensations. Such implementations may be used for training purposes, as one example. It may be appreciated that in other embodiments other wearable electronic device with electrode arrays disposed in other relative locations can be used; the examples presented in FIGS. 7A-7D are merely examples.

Figure 8A:
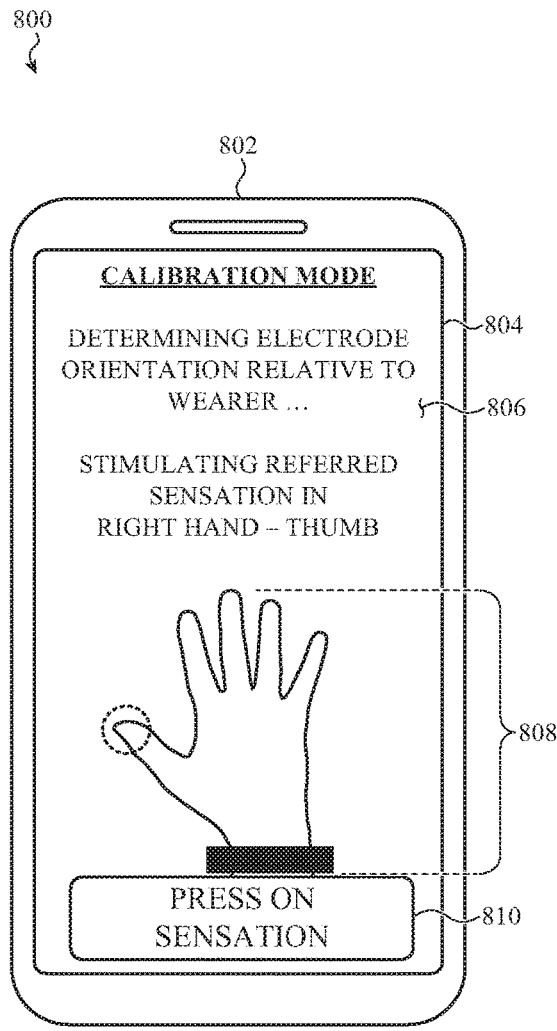
FIGS. 8A-8B depicts a portable electronic device executing an instance of a software application configured to communicably couple to, and calibrate, a wearable electronic device, as described herein.
Figure 8B:
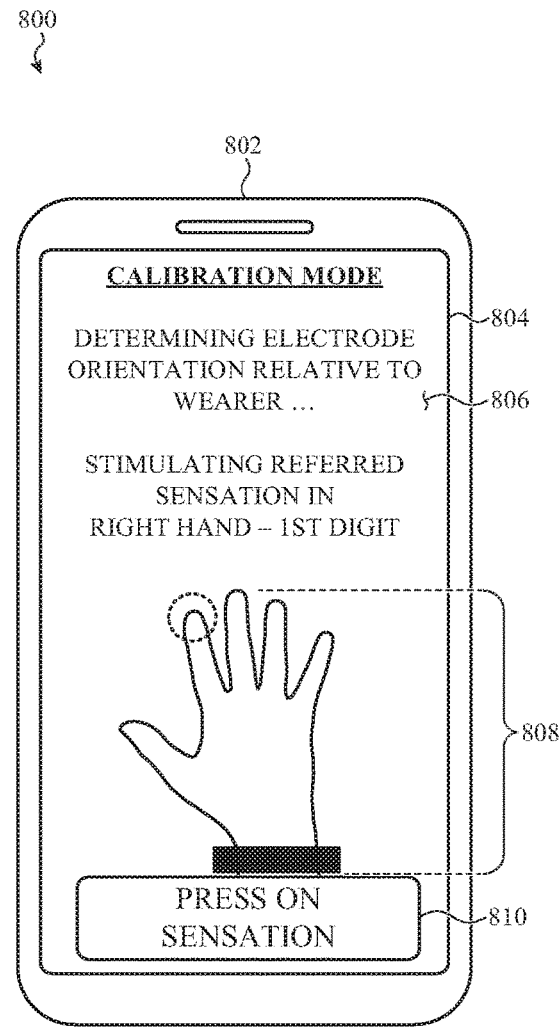

For such embodiments in which electrode arrays may evoke sensations at many different sites, multi-site calibration operations may be performed, such as shown in FIGS. 8A-8B.

In particular, as with preceding embodiments, FIGS. 8A-8B depicts a portable electronic device executing an instance of a software application configured to communicably couple to, and calibrate, a wearable electronic device, as described herein. The system 800 of FIG. 8 includes a portable electronic device 802 that includes a display 804 over which a graphical user interface 806 is rendered.

This graphical user interface 806 can include instructions and a visualization 808 informing the user of how/where to wear the wearable electronic device, where to expect a sensory impression to be evoked (different sites, such as shown in FIG. 8A compared to FIG. 8B), and what modality that sensory impression takes. In response to experiencing the indicated sensation at the indicated site an affordance 810 can be pressed by the user to indicate to the device that the identified sensation was experienced.

Specifically, as noted above, during calibration the wearable electronic device can iterate through one or more combinations of signals and cathode/anode pairs or sets selected from one or more electrodes. The wearable electronic device can pause for a period of time between each test stimulation to afford the user an opportunity to interact with the client application rendering the graphical user interface 806 to indicate whether a particular sensory impression has been experienced.

As with other embodiments described herein, once the user indicates that an intended sensation has been experienced, further refining of signals applied via the electrodes can be performed. For example, the wearable electronic device can modify one or more properties of the test signals that evoked the intended sensory impression having the intended sensory impression modality and the intended sensory impression site. As noted above, such properties include modifying frequency, duty cycle, magnitude, anode/cathode assignments among different electrodes; duration of stimulation; and so on.

In response to each refining operation, as with other embodiments, the user may interact with the affordance 810—or another graphical user interface element rendered in the graphical user interface 806—to indicate to the client application that the sensory experience is perceived in a different way. In other cases, the client application can be configured to monitor acoustic signals and/or may be configured for voice recognition or speech to text conversion. In these examples, a user may audibly indicate "yes" or "no" or similar feedback to indicate to the client application that an intended sensory impression was experienced or not.

In other cases, the graphical user interface 806 may include multiple buttons to indicate different attributes of a sensory experience felt by the user. For example, the graphical user interface 806 may include a button to indicate that a recent stimulation is more localized than a previous stimulation. Another button may be included to indicate that a recent stimulation is less localized than a previous stimulation.

Another button may be included to indicate that a recent stimulation evoked a thermal sensation, a pressure sensation, a texture sensation, or another modality. Another button may be included to indicate whether a particular stimulation was painful or approaching a painful experience. In such examples, the wearable electronic device and/or the client application can define one or more absolute thresholds for a particular user, based on the user's perception. In these examples, any stimulation provided by the wearable electronic device will be below pain thresholds for the user, regardless of modality, site, or calibration.

These foregoing embodiments depicted in FIGS. 7A-8B and the various alternatives thereof and variations thereto are presented, generally, for purposes of explanation, and to facilitate an understanding of various graphical user interfaces that can assist with field calibration of a wearable electronic device as described herein and, in particular that can assist with creation or update of a stimulation plan, a calibration profile, and/or a stimulation profile, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a client device or portable electronic device executing a software application a described herein may not be limited to cellular phone implementations. For example, in some cases calibration can be performed in a virtual environment with the assistance of, as one example, a virtual reality headset or heads up display.

For example, it may be further appreciated that transcutaneous stimulation is not required of all embodiments. As one example, implantable electronic devices may be configured to perform operations of stimulating recruited nerves similar to the transcutaneous embodiments described herein. For example, FIG. 9A depicts an embodiment 900a in which an index finger 902 serves as an implantation site for an implantable electronic device 904.

As with other embodiments described herein, the implantable electronic device 904 includes an electrode array for direct stimulation of the median nerve, thereby evoking an induced transient synesthetic event having a perceived sensory impression site different from the implantation site.

Figure 9A:
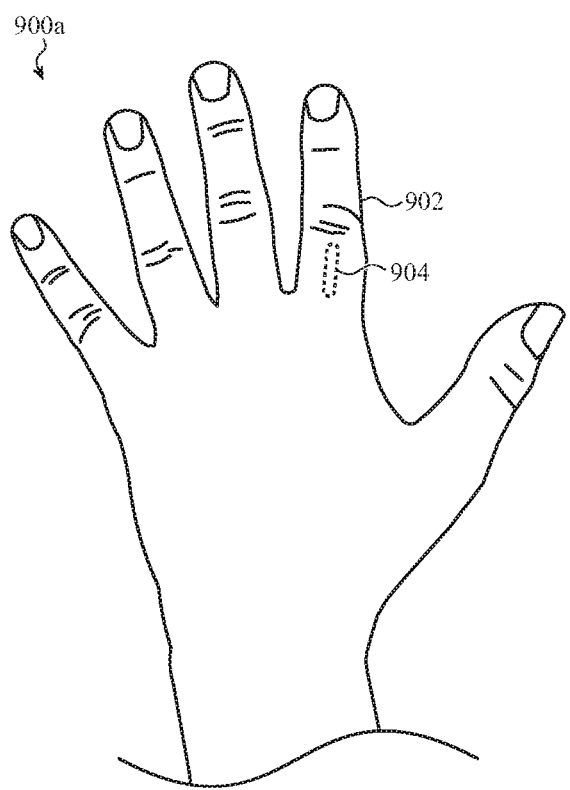
FIG. 9A depicts a finger-implantable electronic device including an electrode array for direct stimulation of a sensory nerve, thereby evoking an induced transient synesthetic event having a perceived sensory impression site different from an implantation site.
Figure 9B:
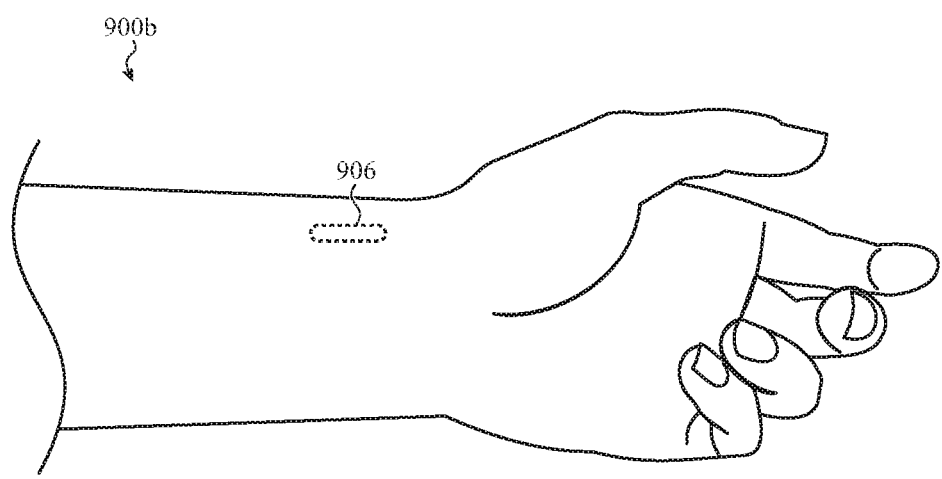
FIG. 9B depicts a wrist-implantable electronic device including an electrode array for direct stimulation of a sensory nerve, with or without communicably coupling to a wearable electronic device such as described above, thereby evoking an induced transient synesthetic event having a perceived sensory impression site different from an implantation site.

As another example, FIG. 9B depicts an embodiment 900b in which a wrist-implantable electronic device 906, including an electrode array for direct stimulation of the median nerve, thereby evoking an induced transient synesthetic event having a perceived sensory impression site different from an implantation site.

These foregoing embodiments depicted in FIGS. 9A-9B and the various alternatives thereof and variations thereto are presented, generally, for purposes of explanation, and to facilitate an understanding of certain implantable embodiments (which may include one or more features such as described in reference to FIG. 3), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some cases, a wearable device as described herein can be used as or with an input device for an electronic device, such as a cellular phone or laptop device as described herein.

Figure 10:
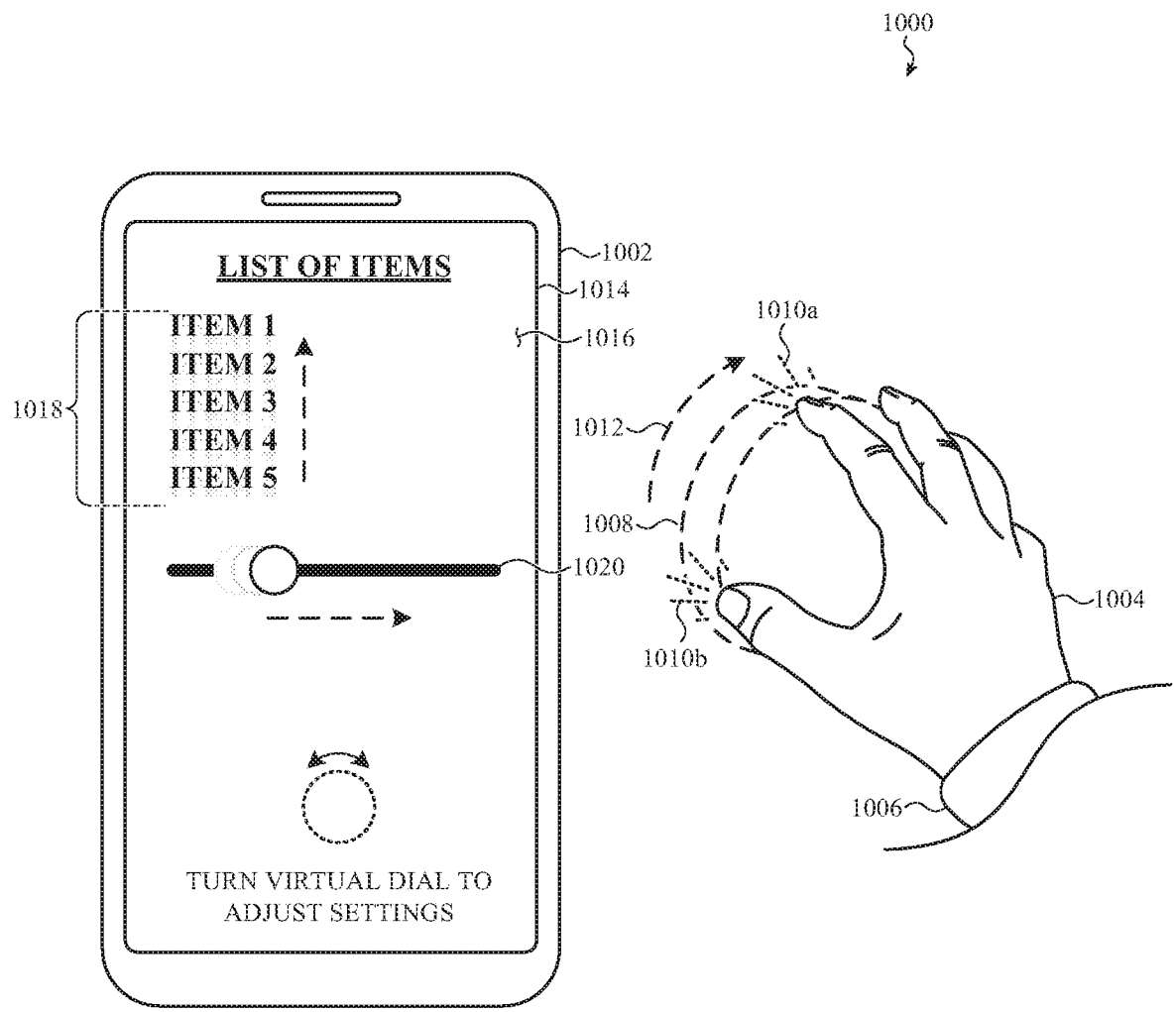
FIG. 10 depicts a portable electronic device executing an instance of a software application configured to operate with a wearable electronic device as described herein to provide haptic feedback.

For example, FIG. 10 depicts a portable electronic device executing an instance of a software application configured to operate with a wearable electronic device as described herein to provide haptic feedback.

The system 1000 includes a portable electronic device 1002 and a user 1004. The user 1004, in this example, wears a wearable electronic device 1006 on the user's wrist so as to evoke sensory experiences associated with manipulating, in space, a virtual object such as a virtual dial 1008. For example, a first sensory experience 1010a perceived at a sensory impression site at the user's index finger and a second sensory experience 1010b perceived at a sensory impression site at the user's index thumb can each mimic a mechanical detent. In other words, as the user 1004 rotates the virtual dial 1008 in a direction 1012, a "click" sensation can be imparted to both the finger and thumb to mimic a sensation of rotating a mechanical dial.

Further, as the user 1004 rotates the virtual dial 1008, the changing angular position of the virtual dial 1008 can be used to inform a change to an element displayed in a graphical user interface rendered by a display 1014 for the portable electronic device 1006, and in particular within a graphical user interface 1016.

The rotation action performed by the user 1004 can be used as input to modify a position of a list of items 1018, change a position of a volume or brightness slider 1020, or for any other suitable purpose.

These foregoing embodiments depicted in FIG. 10 and the various alternatives thereof and variations thereto are presented, generally, for purposes of explanation, and to facilitate an understanding of certain use cases for a wearable electronic device, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, further embodiments described herein relate to methods of providing haptic feedback, methods of inducing transient synesthetic events, and so on.

Figure 11:
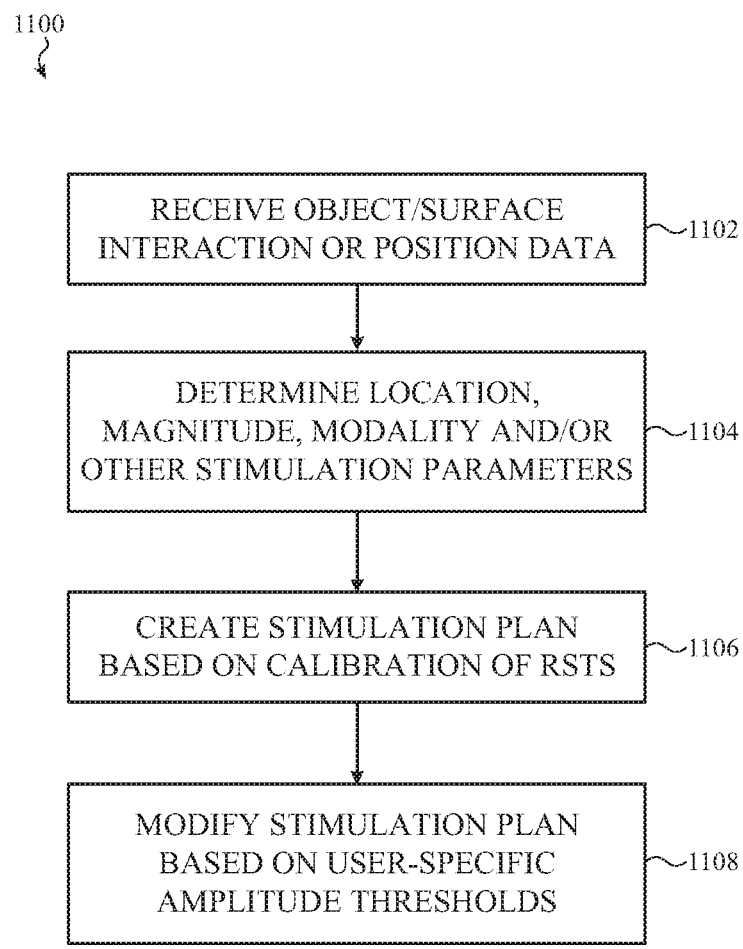
FIG. 11 is a flowchart depicting example operations of a method of creating an stimulation plan to execute a user-specific transient synesthetic event.

FIG. 11 is a flowchart depicting example operations of a method of creating an stimulation plan to execute a user-specific transient synesthetic event. The method 1100 can be performed by any suitable combination of hardware or software such as described herein. In particular, portions of the method 1100 may be performed by a portable electronic device and other portions of the method 1100 can be performed by a wearable electronic device as described herein.

The method 1100 includes operation 1102 in which data describing or comprising information describing an object or surface interaction event is received. This data may be generated by a virtual game environment, a portable electronic device, or any other suitable electronic device.

At operation 1104, one or more sensory impression site and one or more sensory impression modality can be determined. The site(s) may be relative to a particular finger or body part of a user and the modalities may be pressure, temperature, texture, and so on. In many cases combinations of different sites and combinations of different modalities may be time multiplexed together or otherwise presented simultaneously in order to stimulate rich and complex sensory experiences.

At operation 1106, a simulation plan may be created based on the selected modalities and the selected sites. In some cases, the simulation plan may be created by selecting from a data store one or more stimulation profiles generated in a calibration operation, such as described above. The data store may be a portion of the wearable electronic device or may be a portion of a portable electronic device. In some cases, the data store may be provided by a remote third party service. More specifically, a particular target site and a particular target modality at that site can be used to query the data store to return a particular stimulation profile. In some cases, the datastore may be a lookup table or a structured database.

The stimulation plan can also be created or modified based on a calibration profile generated in a calibration operation, such as described herein. As with the stimulation profile, the calibration profile may be obtained by querying a database or data store local or remote to the wearable electronic device.

The method 1100 further includes operation 1108 in which the stimulation plan is modified by user-specific thresholds. The stimulation plan may be modified by, as one example, scaling amplitude of stimulation by a scalar value specific to a user. In other cases, the stimulation plan may be enveloped or clipped so as to not exceed particular values. For example, users with low pain tolerance and/or high somatosensory sensitivity may have stimulation plans clipped to a particular maximum amplitude value.

Figure 12:
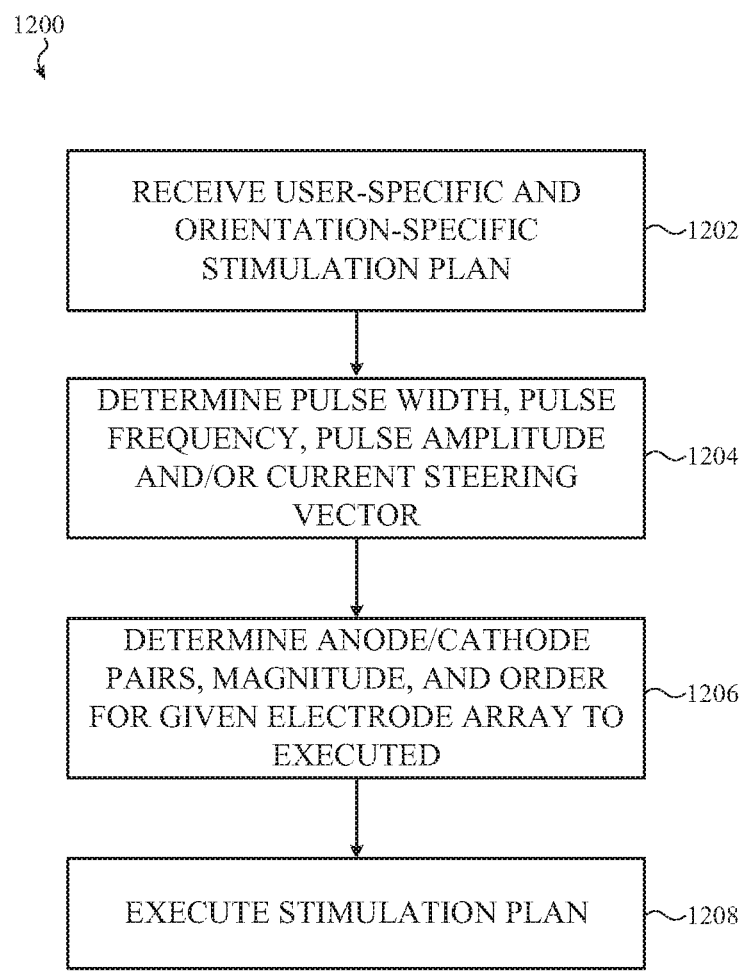
FIG. 12 is a flowchart depicting example operations of a method of inducting a user-specific transient synesthetic event.

FIG. 12 is a flowchart depicting example operations of a method of inducting a user-specific transient synesthetic event. The method 1200 can be performed by any suitable combination of hardware or software such as described herein. In particular, portions of the method 1200 may be performed by a portable electronic device and other portions of the method 1200 can be performed by a wearable electronic device as described herein.

The method 1200 includes operation 1202 at which a user-specific (and orientation-specific) stimulation plan. Next, at operation 1204 parameters associated with that stimulation plan including amplitude, frequency, pulse frequency, pulse width, duty cycle and/or current steering may be determined or obtained from a database or lookup table. Next, at operation 1206 the method 1200 advances to select at least one pairing of electrodes and assigns cathode and anode responsibility to each electrode. In addition, the method 1200 determines what signal parameters to apply to the selected electrodes. Finally, at operation 1208, the stimulation plan may be executed.

Figure 13:
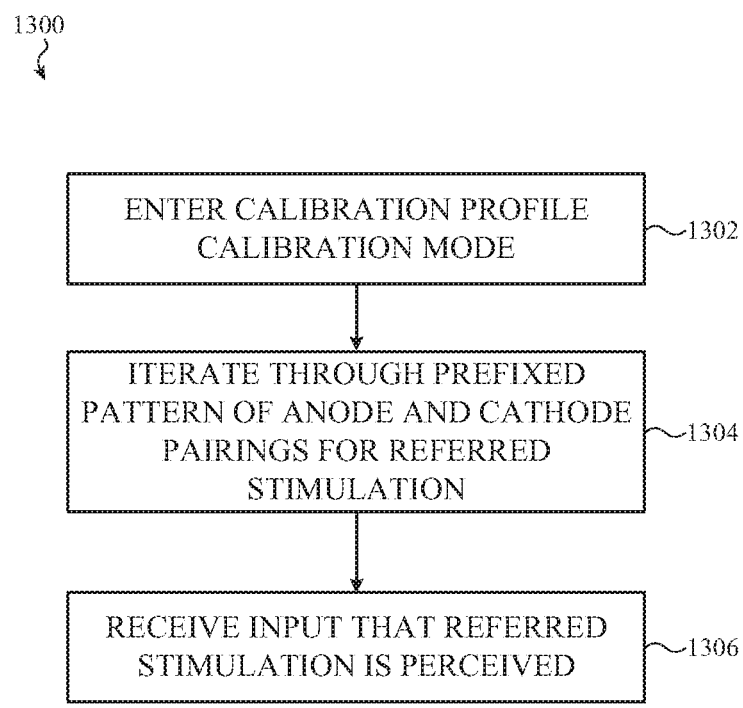
FIG. 13 is a flowchart depicting example operations of a method of calibrating a wearable electronic device as described herein.

FIG. 13 is a flowchart depicting example operations of a method of calibrating a wearable electronic device as described herein. The method 1300 can be performed by any suitable combination of hardware or software such as described herein. In particular, portions of the method 1300 may be performed by a portable electronic device and other portions of the method 1300 can be performed by a wearable electronic device as described herein.

The method 1300 relates to creation of a calibration profile as described herein. In particular, the method 1300 includes operation 1302 at which an electronic device such as the wearable electronic device or a portable electronic device in communication with the wearable electronic device enters a calibration mode in which a calibration profile can be created.

Next at operation 1304, the wearable electronic device can iterate through one or more patterns of cathode and anode assignments and signals to be applied to those pairings can be selected. In some examples, the wearable electronic device can iterate through one or more stimulation profiles such as described herein, changing cathode or anode assignments to determine relative positions of particular electrodes relative to sensory nerves. In these examples, one or more calibration routines may also iterate through stimulation parameters such as pulse width, pulse frequency, pulse amplitude, in addition to as well as electrode pairings or groupings.

In other cases, cathodes and anodes can be assigned in pairs, in other cases, more than one cathode can be used with one or more anode. In other words, a positive terminal of a signal generator within a wearable electronic device as described herein can be coupled to a cathode or a group of cathodes distributed at different locations within an electrode array and a negative terminal of the same signal generator can be coupled to one or more other electrodes, serving as anodes thereof.

A signal generator as described herein can be implemented in a number of ways. In some cases, the signal generator can be implemented at least in part in software. In other cases the signal generator can include a digital to analog converter, a shift register (operable to iterate through sample points of an analog waveform fed as input to a DAC), a direct digital synthesizer, or any other suitable digital to analog signal conversion topology. In some cases, a signal generator as described herein may be configured to output a square wave or a triangular wave having a frequency, a duty cycle, an amplitude, a phase, or other properties that may be digitally set or controlled by a wearable electronic device as described herein.

Once a number of signals generated by the signal generator are applied to specified sets of electrodes (assigned different anode or cathode assignments for different signals) the method 1300 can advance to receive input from a wearer of the electronic device that a referred sensation has been perceived. As with other embodiments described herein, this input can be provided by a user by interacting with an affordance rendered in a graphical user interface of, for example, a portable electronic device in communication with the wearable electronic device.

In some examples, a trained machine learning model and/or sensor inputs can be used to determine which signals to apply, which electrodes to assign as anodes or cathodes, or which signal parameters should be increased, decreased, or otherwise modified.

For example, in some cases, over time a wearable electronic device as described herein may determine that certain signals applied to particular electrodes do not evoke desirable sensations in a particular user or group of users. In these examples, a machine learning model can be trained with prior calibrations and/or stimulation profiles or calibration profiles. More particularly, a dataset comprising labels of "sensory impression received" or "sensory impression not received" against different calibration parameters can be used to train a machine learning model across a single user or across multiple users. In these examples, patterns may emerge that inform which signals are likely to evoke sensations for particular users, particular demographics, particular environments (e.g., temperature, humidity, geographic location, and so on), and so on.

In such examples, operation 1304 can be informed, at least in part by operation of the trained machine learning model.

In this manner, the method 1300 can be leveraged to determine which electrodes can be used, with which anode/cathode assignments, to stimulate a sensory nerve of a particular user given a particular orientation of the wearable electronic device.

Figure 14:
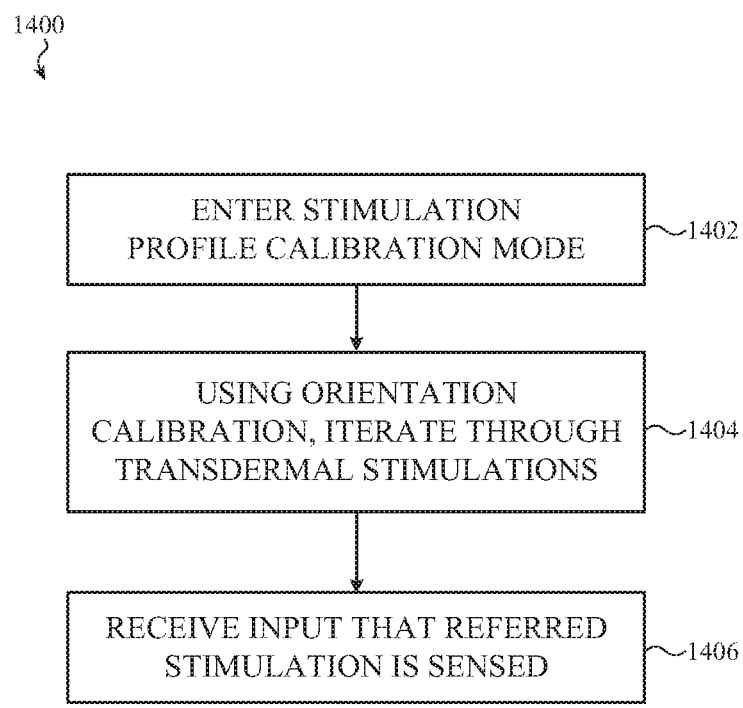
FIG. 14 is a flowchart depicting example operations of a method of calibrating stimulation provided by a wearable electronic device as described herein.

FIG. 14 is a flowchart depicting example operations of a method of calibrating stimulation provided by a wearable electronic device as described herein. The method 1400 can be performed by any suitable combination of hardware or software such as described herein. In particular, portions of the method 1400 may be performed by a portable electronic device and other portions of the method 1400 can be performed by a wearable electronic device as described herein.

The method 1400 relates to creation of a stimulation profile as described herein. In particular, the method 1400 includes operation 1402 at which an electronic device such as the wearable electronic device or a portable electronic device in communication with the wearable electronic device enters a calibration mode in which a stimulation profile can be created.

Next at operation 1404 the wearable electronic device can iterate through different signals (given a particular calibration profile associating electrode locations to a location of a sensory nerve to stimulation). In addition, these iterated signals can be assigned to different cathodes and anodes. In other words, as described above. a positive terminal of a signal generator within a wearable electronic device as described herein can be coupled to a cathode or a group of cathodes distributed at different locations within an electrode array and a negative terminal of the same signal generator can be coupled to one or more other electrodes, serving as anodes thereof.

Thereafter, at operation 1406, an input may be received from a user indicating that a particular sensory impression has been perceived.

In this manner, the method 1400 can be leveraged to determine what types of stimulation of a sensory nerve of a particular user evoke which sensation modalities at which sensation sites. As with other embodiments, the method 1400 can be performed at least in part by, or may be performed while leveraging output from, a trained machine learning model.

Figure 15:
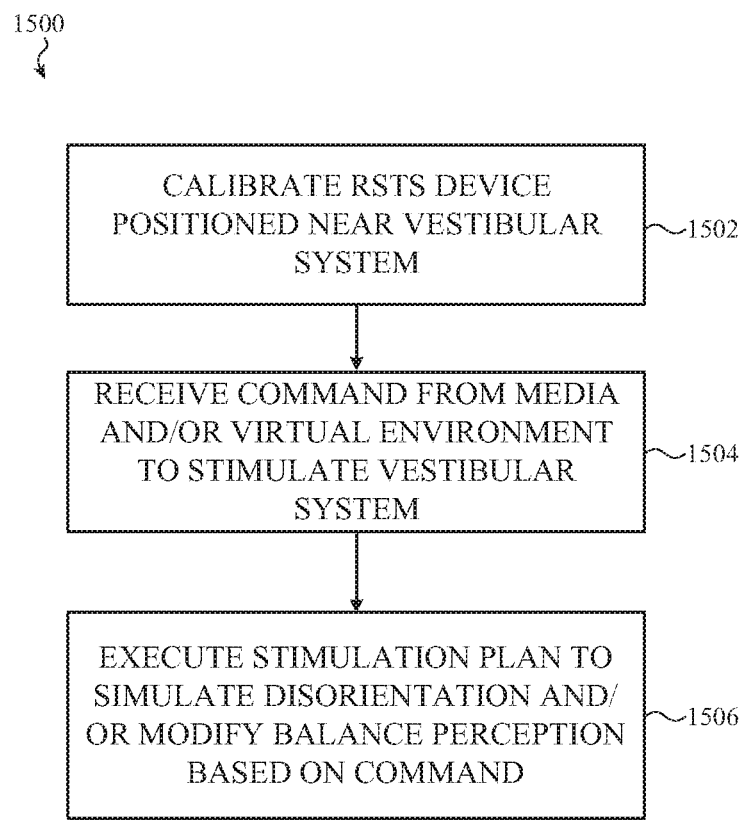
FIG. 15 is a flowchart depicting example operations of a method of inducing disorientation with a wearable electronic device as described herein.

FIG. 15 is a flowchart depicting example operations of a method of inducing disorientation with a wearable electronic device as described herein. The method 1500 can be performed by any suitable combination of hardware or software such as described herein. In particular, portions of the method 1500 may be performed by a portable electronic device and other portions of the method 1500 can be performed by a wearable electronic device as described herein.

The method 1500 includes operation 1502 at which a wearable electronic device is calibrated against a user's vestibular system. For example, the device may be positioned behind a user's ear adjacent to the user's mastoid process. Thereafter at operation 1504, a command may be received at the wearable electronic device (or another device) to stimulate the user's vestibular system to induce disorientation, nausea, or a sense of imbalance. This operation may be performed for training purposes, to enhance discomfort associated with an entertainment experience, to induce or to augment a sensation of vertigo or balance, and so on. At operation 1504, the stimulation plan may be executed by the wearable electronic device.

Figure 16:
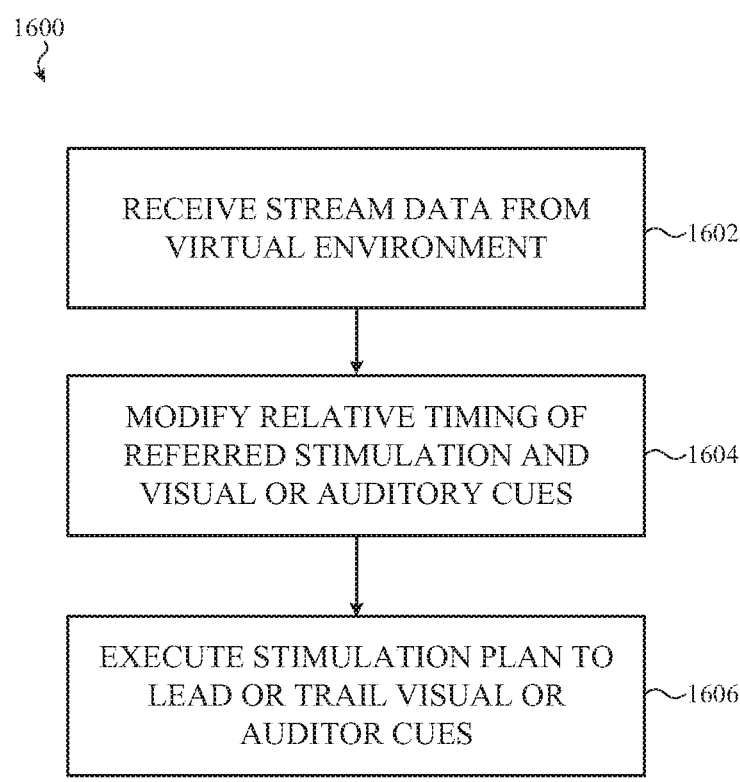
FIG. 16 is a flowchart depicting example operations of a method of operating a wearable electronic device based on events occurring in a virtual environment.

FIG. 16 is a flowchart depicting example operations of a method of operating a wearable electronic device based on events occurring in a virtual environment. The method 1600 can be performed by any suitable combination of hardware or software such as described herein. In particular, portions of the method 1600 may be performed by a portable electronic device and other portions of the method 1600 can be performed by a wearable electronic device as described herein.

The method 1600 relates to use of a wearable electronic device as described herein with a virtual gaming environment. The method 1600 includes operation 1602 at which stream data is received from a game engine. The stream data may include information linking an audiovisual stimulus with a haptic or sensory effect to be evoked by a wearable electronic device as described herein. Next, at operation 1604, the sensory/haptic effect can be desynchronized from the audiovisual effect (stimulated out of phase) so that the sensory effect is executed (at operation 1606) before (e.g., on an order of hundreds of milliseconds) the audiovisual effect to more accurately simulate the timing difference between audiovisual responses of a user and somatosensory responses of the same user.

In some cases, a delay separating an evoked sensory impression as described herein and an audiovisual stimulus rendered in a virtual environment may be user specific and/or virtual environment specific. For example, in some cases, visual stimulation may be presented closer in time with evoked sensory impressions (e.g., high-speed games or fast reaction time games, such as racing games). In other cases, audio/visual stimulation may be presented in a particular perceived spatial location (e.g., by leveraging phase delays between left and right ear channels and/or by application of a head-related transfer function to incoming audio signals) that corresponds to a sensory impression site. For example, a dorsal surface of a user's hand can be stimulated with a pressure sensation before a visual rendering of a small insect is rendered on a virtual hand of the user and an insect sound is generate that spatially appears to originate from the virtual insect rendered on the back of the user's virtual hand. In this example, a user may perceive a touch before audio-visual feedback confirms for the user that a virtual insect has landed upon the user's virtual hand.

Figure 17:
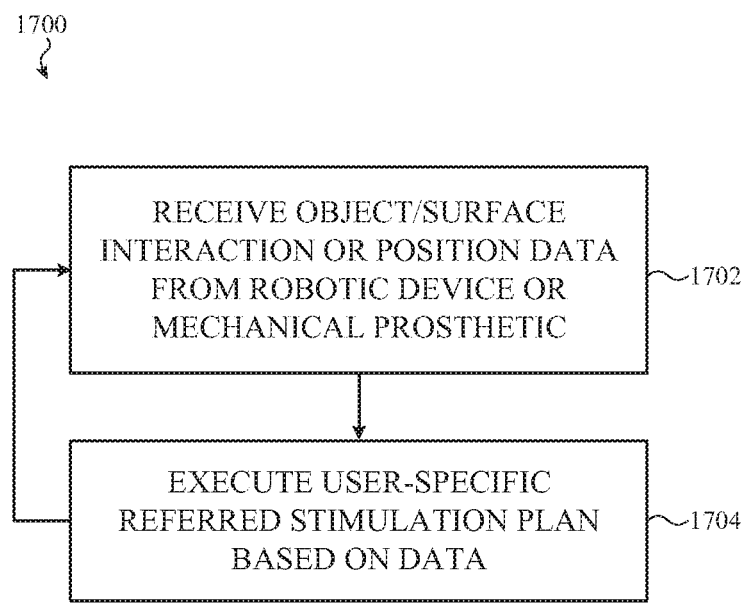
FIG. 17 is a flowchart depicting example operations of a method of operating a wearable electronic device as described herein.

FIG. 17 is a flowchart depicting example operations of a method of operating a wearable electronic device as described herein. The method 1700 can be performed by any suitable combination of hardware or software such as described herein. In particular, portions of the method 1700 may be performed by a portable electronic device and other portions of the method 1700 can be performed by a wearable electronic device as described herein.

The method 1700 relates to use of a wearable electronic device as described herein with a physical apparatus such as a surgical robot, a robotic device, or a mechanical prosthetic. This method, which may be operated in a loop, includes operation 1702 at which an object or surface interaction is detected at the apparatus. In some cases, a sensing system of the apparatus may be configured to detect texture, pressure, and/or temperature of a grasped object or a surface with which the apparatus interacts. Next, at operation 1704, properties detected at operation 1702 can be evoked as sensory impressions such as described above. In many cases, as described above, these sensory impressions may be user-specific (e.g., custom calibration profile, custom stimulation profile, custom stimulation plan, custom enveloping, custom clipping, and so on).

Figure 18:
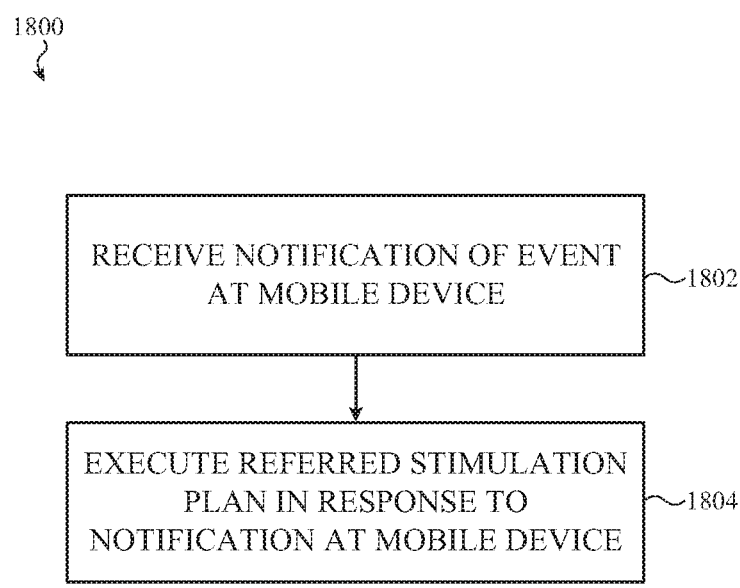
FIG. 18 is a flowchart depicting example operations of a method of providing haptic feedback to a user of a portable electronic device.

FIG. 18 is a flowchart depicting example operations of a method of providing haptic feedback to a user of a portable electronic device. The method 1800 can be performed by any suitable combination of hardware or software such as described herein. In particular, portions of the method 1800 may be performed by a portable electronic device and other portions of the method 1800 can be performed by a wearable electronic device as described herein.

The method 1800 relates to use of a wearable electronic device as described herein with an electronic device, such as a cellular phone. The method includes operation 1802 at which a notification is received at the portable electronic device. The notification may correspond to receipt of an incoming call, a new message, an event detected by a particular app, and so on.

In response to the notification received at the electronic device, a stimulation plan can be executed by the wearable electronic device at operation 1804 to induce a sensory impression to notify the user of the event at the portable electronic device. For example, the user may perceive two taps to a dorsal side of the left hand in response to receiving an email at the user's cellular phone. In another example, the user may perceive tracing of a circle shape on the palm of the user's right hand in response to receiving a message form a particular sender.

These examples are not exhaustive; many are possible as may be appreciated by a person of skill in the art.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

As used herein, the term "processing resource" refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example processing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

More generally, as described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, as described herein, the term "memory" refers to any software and/or hardware-implemented data storage device or circuit physically and/or structurally configured to store digital information, whether structured or unstructured.

Further, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A wearable electronic device for stimulating referred sensation, the wearable electronic device comprising:
    a housing defining an exterior surface configured to contour to a skin surface of a user;
    an electrode array extending at least partially through the exterior surface to contact the skin surface;
    a memory resource storing at least one executable asset; and
    a processing resource operably coupled to the memory resource and configured to cooperate with the memory resource to access the at least one executable asset to instantiate an instance of software configured to:
        determine a sense impression site at which to induce a sensation, the sense impression site distal to a stimulation site above a sensory nerve of the user, the sensory nerve innervating the sense impression site;
        determine a sense impression modality corresponding to a sensation type to induce for the user at the sense impression site;
        query a first data store with the sense impression site and sense impression modality to retrieve a stimulation profile comprising a magnitude and a polarity of current such that inducing the current in the sensory nerve causes an afferent signal that evokes a sensory impression localized at the sense impression site, the sensory impression corresponding to the sense impression modality;
        query a second data store with the stimulation profile to retrieve a calibration profile comprising information relating locations of the electrodes of the electrode array to the user as the wearable electronic device is worn by the user;
        query a third data store to obtain a user-specific profile comprising a threshold defining a limit to the magnitude of current of the stimulation profile;
        create a stimulation plan with the stimulation profile, the user-specific profile, and the calibration profile, the stimulation plan comprising parameters defining at least one signal to apply across a selected pair of electrodes of the electrode array to induce, at the sensory nerve, the current having the magnitude and polarity as defined by the stimulation profile so as to induce the afferent signal; and
        execute the stimulation plan by generating and applying the at least one signal across the selected pair of electrodes.

2. The wearable electronic device of claim 1, wherein the housing has an annular shape and the wearable electronic device is configured to be worn on a finger of the user.

3. The wearable electronic device of claim 2, wherein the finger is an index finger or a middle finger and the sensory nerve is a median nerve.

4. The wearable electronic device of claim 2, wherein the sense impression site is a user's fingertip.

5. The wearable electronic device of claim 1, wherein the wearable electronic device is configured to be worn on a wrist of the user.

6. The wearable electronic device of claim 1, wherein a first electrode of the electrode array is formed from a first metal and a second electrode of the electrode array is formed from a second metal.

7. The wearable electronic device of claim 1, wherein the user-specific profile comprises a maximum current that may be induced.

8. The wearable electronic device of claim 1, wherein the instance of software is configured to receive a signal from a separate electronic device, the signal comprising an instruction to evoke a sensory impression for the user the sensory impression comprising the sense impression modality and the sense impression site.

9. The wearable electronic device of claim 8, wherein the separate electronic device comprises a virtual computing environment.

10. The wearable electronic device of claim 1, wherein the sense impression modality is selected from:

a pressure sense impression;

a temperature sense impression;

a texture sense impression; or a time-varying mechanical sense impression.

\* \* \* \* \*